United States Patent
Ishii et al.

(10) Patent No.: US 11,700,344 B2
(45) Date of Patent: Jul. 11, 2023

(54) IMAGE READING DEVICE AND IMAGE FORMING APPARATUS INCORPORATING THE IMAGE READING DEVICE

(71) Applicants: Tatsuya Ishii, Kanagawa (JP); Hideki Hashimoto, Tokyo (JP); Yoshio Konno, Kanagawa (JP)

(72) Inventors: Tatsuya Ishii, Kanagawa (JP); Hideki Hashimoto, Tokyo (JP); Yoshio Konno, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/486,916

(22) Filed: Sep. 28, 2021

(65) Prior Publication Data
US 2022/0109776 A1   Apr. 7, 2022

(30) Foreign Application Priority Data

Oct. 2, 2020  (JP) ................................ 2020-167908
Jun. 18, 2021  (JP) ................................ 2021-101589

(51) Int. Cl.
*H04N 1/40* (2006.01)
*H04N 1/401* (2006.01)
*H04N 1/00* (2006.01)

(52) U.S. Cl.
CPC ......... *H04N 1/401* (2013.01); *H04N 1/00798* (2013.01)

(58) Field of Classification Search
None
See application file for complete search history.

(56) References Cited

U.S. PATENT DOCUMENTS

| | | | | |
|---|---|---|---|---|
| 9,503,605 B2* | 11/2016 | Sugiyama | .............. | H04N 1/125 |
| 2006/0250661 A1* | 11/2006 | Susaki | .................. | H04N 1/401 |
| | | | | 358/461 |
| 2007/0285739 A1* | 12/2007 | Nakano | ................ | H04N 1/4076 |
| | | | | 358/474 |
| 2009/0316166 A1* | 12/2009 | Kubo | .................... | H04N 1/4097 |
| | | | | 358/1.9 |
| 2011/0013238 A1* | 1/2011 | Kamio | ................... | H04N 1/401 |
| | | | | 358/475 |
| 2011/0051201 A1 | 3/2011 | Hashimoto et al. | | |
| 2013/0001400 A1* | 1/2013 | Tanaka | ............... | H04N 1/00026 |
| | | | | 250/208.1 |
| 2014/0204432 A1 | 7/2014 | Hashimoto et al. | | |
| 2014/0211273 A1 | 7/2014 | Konno et al. | | |

(Continued)

FOREIGN PATENT DOCUMENTS

JP   2007-208878   8/2007

*Primary Examiner* — Dung D Tran
(74) *Attorney, Agent, or Firm* — Xsensus LLP

(57) ABSTRACT

An image reading device includes a background unit, a reading unit, and circuitry. The background unit is configured to be a background in reading of a recording medium and includes a first region that is black and a second region that is different from the first region. The reading unit is configured to read an image with the background unit as the background, and generate a read value based on a result of reading the image with the background unit. The circuitry is configured to correct the read value based on a reference value generated by the reading unit by reading the second region of the background unit.

11 Claims, 17 Drawing Sheets

(56) References Cited

U.S. PATENT DOCUMENTS

| | | | |
|---|---|---|---|
| 2015/0222790 A1 | 8/2015 | Asaba et al. | |
| 2016/0003673 A1 | 1/2016 | Hashimoto et al. | |
| 2016/0344894 A1* | 11/2016 | Koseki | H04N 1/124 |
| 2018/0020108 A1* | 1/2018 | Nakayama | B65H 5/068 |
| 2018/0198951 A1* | 7/2018 | Onuma | H04N 1/3878 |
| 2018/0198953 A1* | 7/2018 | Misaka | H04N 1/4076 |
| 2019/0132454 A1* | 5/2019 | Fukase | H04N 1/00045 |

* cited by examiner

IMAGE READING DEVICE AND IMAGE FORMING APPARATUS INCORPORATING THE IMAGE READING DEVICE

CROSS-REFERENCE TO RELATED APPLICATIONS

This patent application is based on and claims priority pursuant to 35 U.S.C. § 119(a) to Japanese Patent Application Nos. 2020-167908, filed on Oct. 2, 2020, and 2021-101589, filed on Jun. 18, 2021, in the Japan Patent Office, the entire disclosure of each of which is hereby incorporated by reference herein.

BACKGROUND

Technical Field

Embodiments of the present disclosure relate to an image reading device and an image forming apparatus incorporating the image reading device.

Background Art

A light source such as a lamp may be used to read an image. In such a case, variation in light amount of a lamp may cause the uneven image density.

In order to prevent generation of the uneven image density, an image reading device causes an image sensor to read the color of a reference roller to generate correction data (shading data). Then, the image reading device corrects a read image signal with the correction data. Thus, such an image reading device is known to employ a technique to correct read data in real time and prevent generation of the uneven image density due to variation of the light amount.

SUMMARY

Embodiments of the present disclosure described herein provide a novel image reading device including a background unit, a reading unit, and circuitry. The background unit is configured to be a background in reading of a recording medium. The background unit includes a first region that is black and a second region that is different from the first region. The reading unit is configured to read an image with the background unit as the background, and generate a read value based on a result of reading the image with the background unit. The circuitry is configured to correct the read value based on a reference value generated by the reading unit by reading the second region of the background unit.

Further, embodiments of the present disclosure described herein provide an image forming apparatus including an image forming device, a background unit, a reading unit, and a correction unit. The image forming device is configured to form an image on a recording medium. The background unit is configured to be used as a background in reading a recording medium with the image formed by the image forming device. The background unit includes a first region that is black and a second region that is different from the first region. The reading unit is configured to read the image with the background unit as the background, and generate a read value based on a result of reading the image with the background unit. The correction unit is configured to correct the read value based on a reference value generated by the reading unit by reading the second region of the background unit.

BRIEF DESCRIPTION OF THE SEVERAL VIEWS OF THE DRAWINGS

Exemplary embodiments of this disclosure will be described in detail based on the following figures, wherein.

Figure 1:
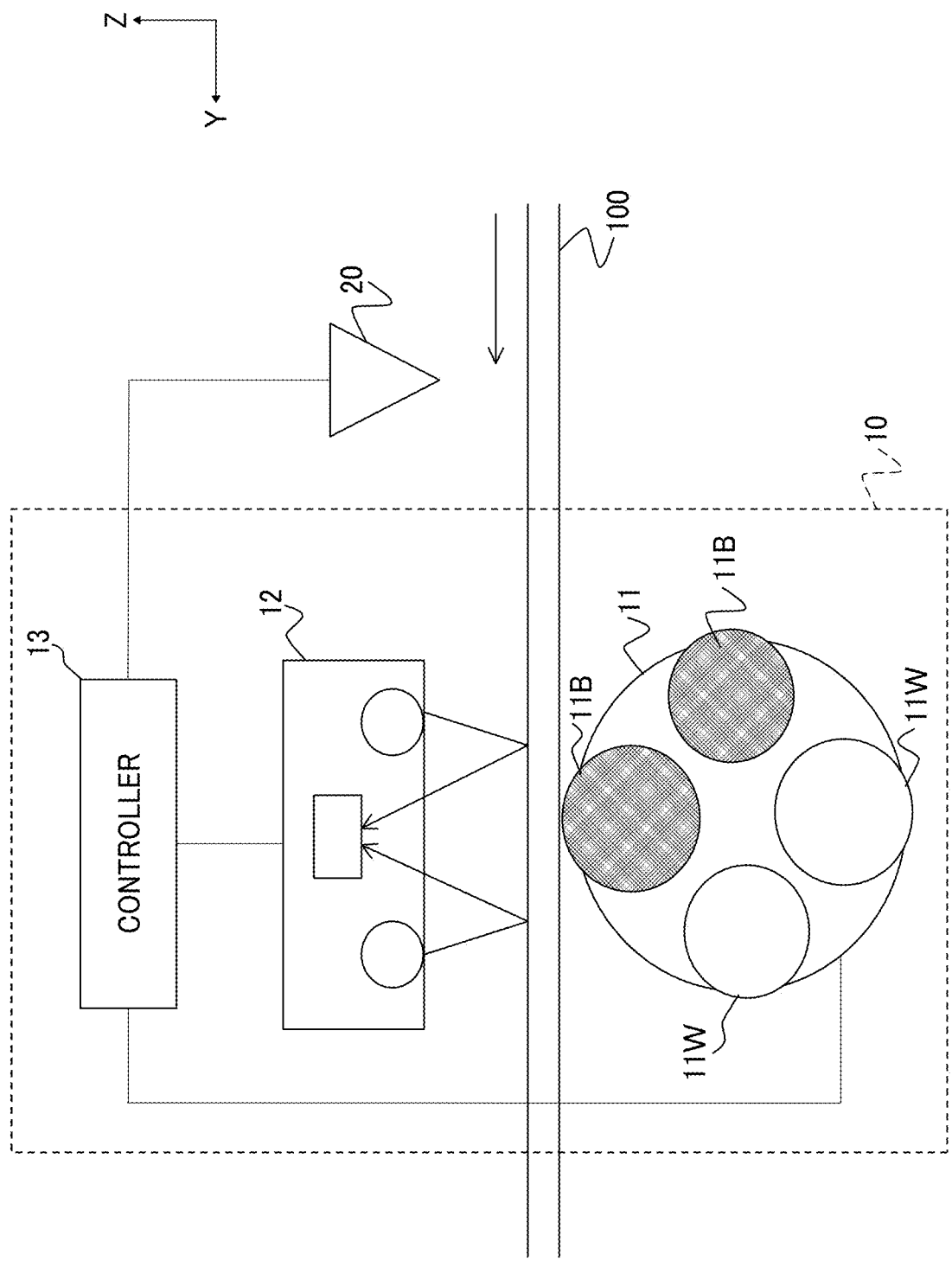
FIG. 1 is a diagram illustrating a configuration of an image reading device according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. Like numbers referred to like elements throughout.

As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Next, a description is given of a configuration and functions of an image reading device and an image forming apparatus, according to an embodiment of the present disclosure, with reference to drawings. Note that identical parts or equivalents are given identical reference numerals and redundant descriptions are summarized or omitted accordingly.

Descriptions are given of an image reading device and an image forming apparatus according to an embodiment of the present disclosure, with reference to the following figures. Note that the embodiments are not limited to the illustrated examples and the specific examples described below.

First Embodiment

For example, an image reading device 10 has the following hardware configuration.

Example of Image Reading Device

FIG. 1 is a diagram illustrating a configuration of an image reading device 10 according to an embodiment of the present disclosure.

Hereinafter, a description is given of the image reading device 10 with as sheet 100 functioning as a recording medium. The sheet 100 is conveyed from right to left in FIG. 1. Specifically, the arrow in FIG. 1 indicates a direction to convey the sheet 100, which is simply referred to as a sheet conveyance direction. Note that the sheet conveyance direction is also referred to as a Y direction. Further, a direction perpendicular to the sheet conveyance direction, in other words, a plain of the sheet 100 is also referred to as a Z direction. In FIG. 1, the Z direction corresponds to a vertical direction.

The image reading device 10 has a hardware configuration including, for example, a roller 11, a line sensor 12, and a controller 13. Note that the hardware configuration of the image reading device 10 is not limited to the above-described example. For example, the image reading device 10 is preferably a hardware configuration that further includes an illumination device that functions as a light source, for example, a lamp or a light emitting diode (LED).

Further, the image reading device 10 is configured to connect, for example, a conveyance sensor 20. Specifically, the conveyance sensor 20 is disposed upstream from the image reading device 10 in a sheet conveyance passage. In FIG. 1, the conveyance sensor 20 is disposed on the right side. The conveyance sensor 20 detects presence or absence of the sheet 100. Further, the conveyance sensor 20 sends a detection result to the image reading device 10. Due to such a configuration, the image reading device 10 is capable of grasping that there is the sheet 100 and that the sheet 100 is conveyed, based on the detection result of the conveyance sensor 20. As described above, the image reading device 10 may be connected to a peripheral device, for example, the conveyance sensor 20.

The line sensor 12 is, for example, an optical sensor. When the line sensor 12 performs reading, the image reading device 10 obtains a read result such as a read value.

The controller 13 is, for example, an arithmetic device, a storing device, and an input-output device. Note that the controller 13 may be, for example, an external device of the image reading device 10. The controller 13 processes or stores the read result by the line sensor 12. The controller 13 may control the switching of the roller 11 and drive the roller 11. Note that the roller 11 may be switched by control performed by a device other than the controller 13 or by operation performed by a user.

The roller 11 is made of a combination of, for example, a white member (hereinafter, a white member 11W) and a black member (hereinafter, a black member 11B). For example, the controller 13 controls the roller 11 to bring the black member 11B to be located immediately below the line sensor 12, as illustrated in FIG. 1. Due to this control, the background in reading the sheet 100 is black. The reading is performed under this condition to generate image data that indicates a read image with a black background.

On the other hand, as the controller 13 switches the position of the roller 11 to bring the white member 11W to be located immediately below the line sensor 12, the background in reading the sheet 100 is white. The reading is performed under this condition to generate image data that indicates a read image with a white background.

Note that the background unit has, for example, a configuration as follows.

Figure 2:
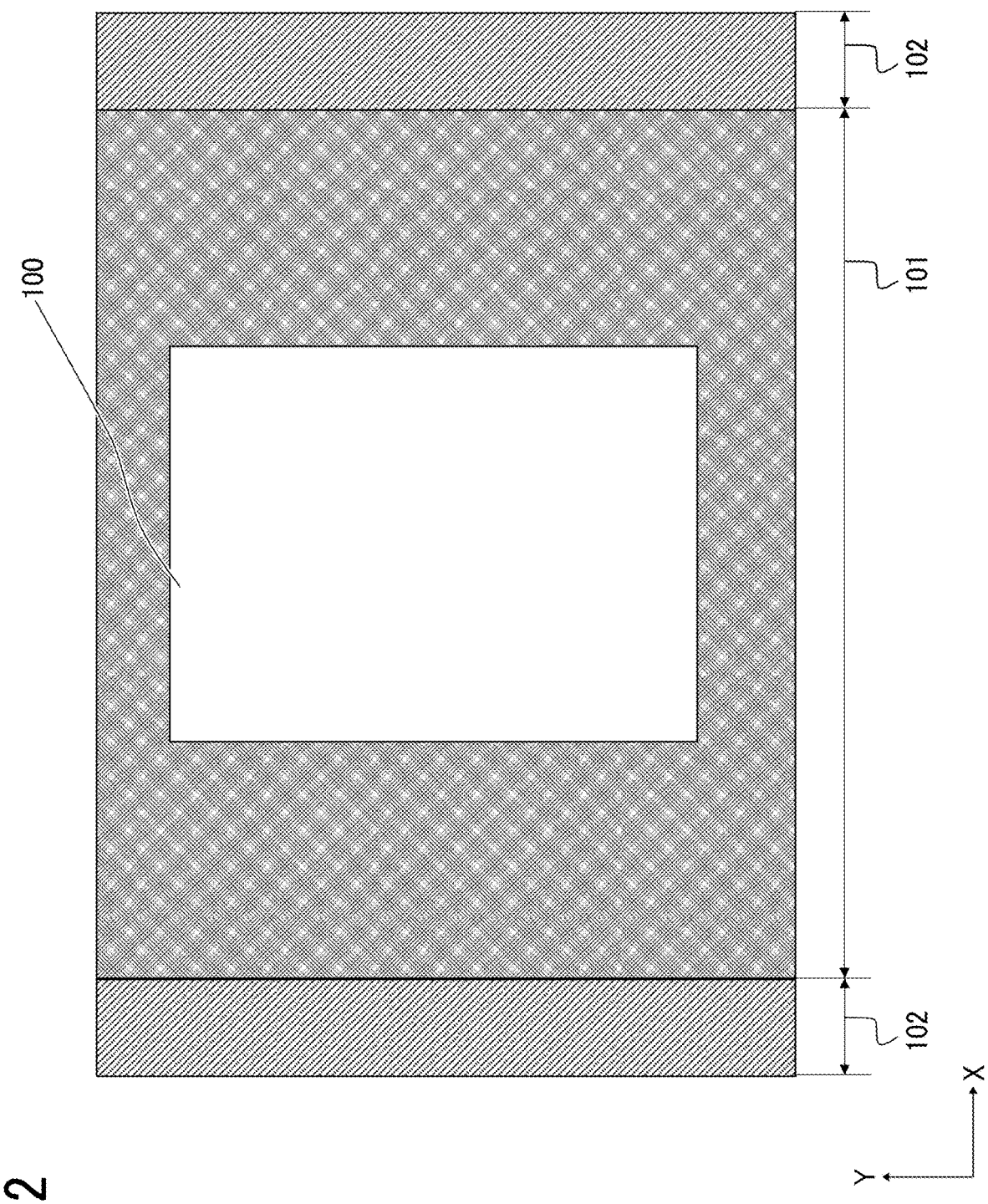
FIG. 2 is a diagram illustrating an image read by a line sensor.

FIG. 2 is a diagram illustrating an image read by the line sensor 12.

Now, a description is given of a case in which the sheet 100 is white.

In a case in which the sheet 100 is white, the image reading device 10 reads the black background (black member 11B) and the white background.

Figure 18:
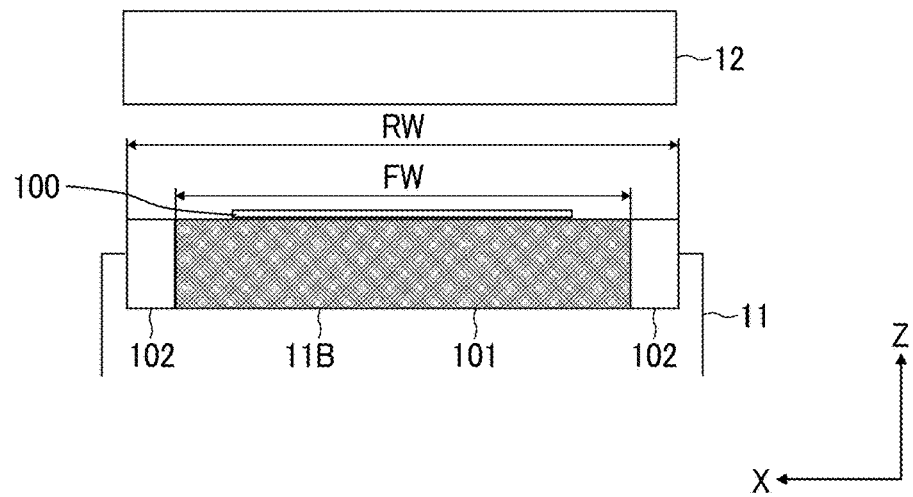
FIG. 18 is a diagram illustrating a hardware configuration of the image reading device.

On the other hand, FIG. 18 is a diagram illustrating a hardware configuration of the image reading device 10.

As illustrated in, for example, FIG. 18, the white background is located at both ends of the black member 11B in the X direction in FIG. 18, that is the main scanning direction. That is, the region out of the sheet 100, which is indicated as the first region 101 in FIG. 2, is black and the regions other than the first region 101, each of which is indicated as the second region 102 in FIG. 2, are white. Therefore, the line sensor 12 reads both the regions in white at either end of the background of the sheet 100 and the region in black at the center of the background of the sheet 100. As described above, with the hardware configuration illustrated in FIG. 18, the image reading device 10 reads the image of the sheet 100, the first region 101, and the second regions 102, as illustrated in FIG. 2.

The first region 101 is, for example, an area through which the sheet 100 passes. Note that the area in which the line sensor 12 senses a reading target object (hereinafter, referred to as a "read area") is, for example, set in advance. Then, the image generated based on the read result is black in the background when the black member 11B functions as the background.

The second region 102 is, for example, areas at both ends of the roller 11 (that is, the regions outside the first region 101 in the X direction in the example illustrated in FIG. 2). In other words, the second region 102 is an area through which the sheet 100 does not pass. For example, as illustrated in FIG. 18 that is a configuration viewed in the Y direction of FIG. 1, the black member 11B (i.e., the first region 101) is within a region FW through which the sheet 100 passes and the second region 102 is outside the region FW. Further, a read region RW includes the first region 101 and the second region 102.

Note that the second region 102 may be in a region at a position out of the first region 101. For example, the second region 102 may be, for example, one of both ends of the roller 11.

Further, since the sheet 100 does not pass through the second region 102, the second region 102 may be a member that is disposed out of the roller 11.

Figure 19:
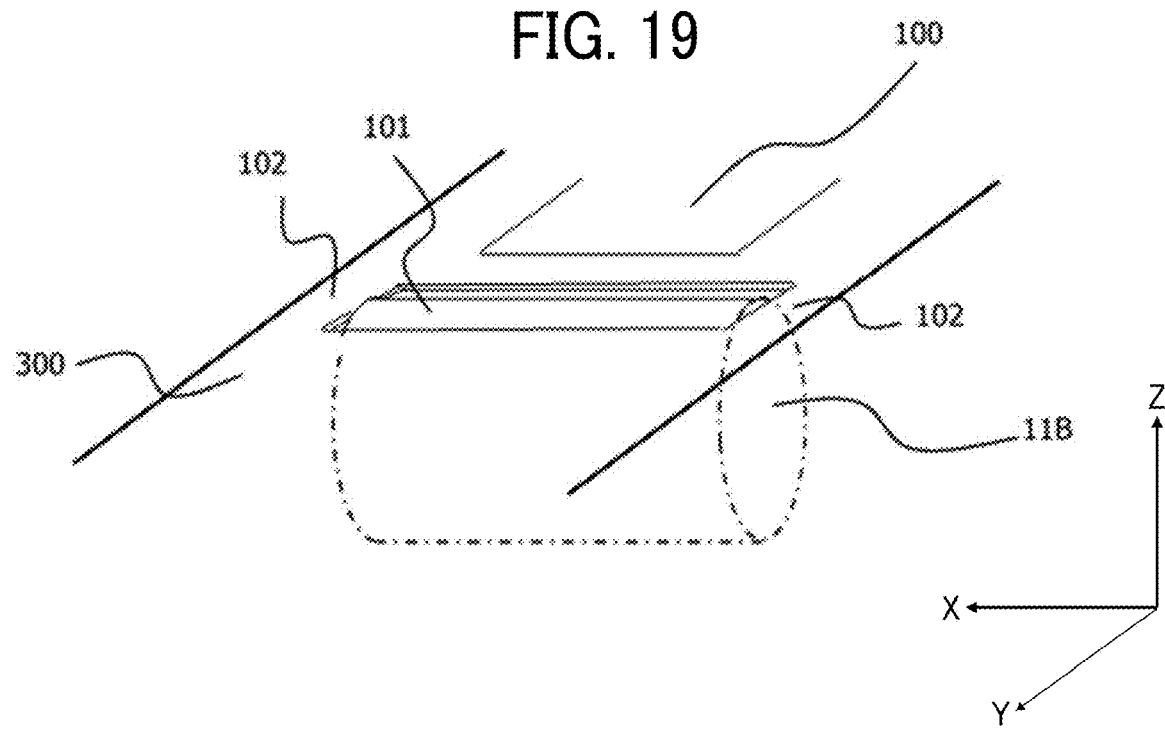
FIG. 19 is a diagram illustrating another hardware configuration of the image reading device.

For example, FIG. 19 is a diagram illustrating another hardware configuration of the image reading device 10.

As illustrated in FIG. 19, the second region 102 may be disposed in the regions through which the sheet 100 does not pass, at both ends of the conveyance guide 300 that guides the sheet 100.

Figure 20:
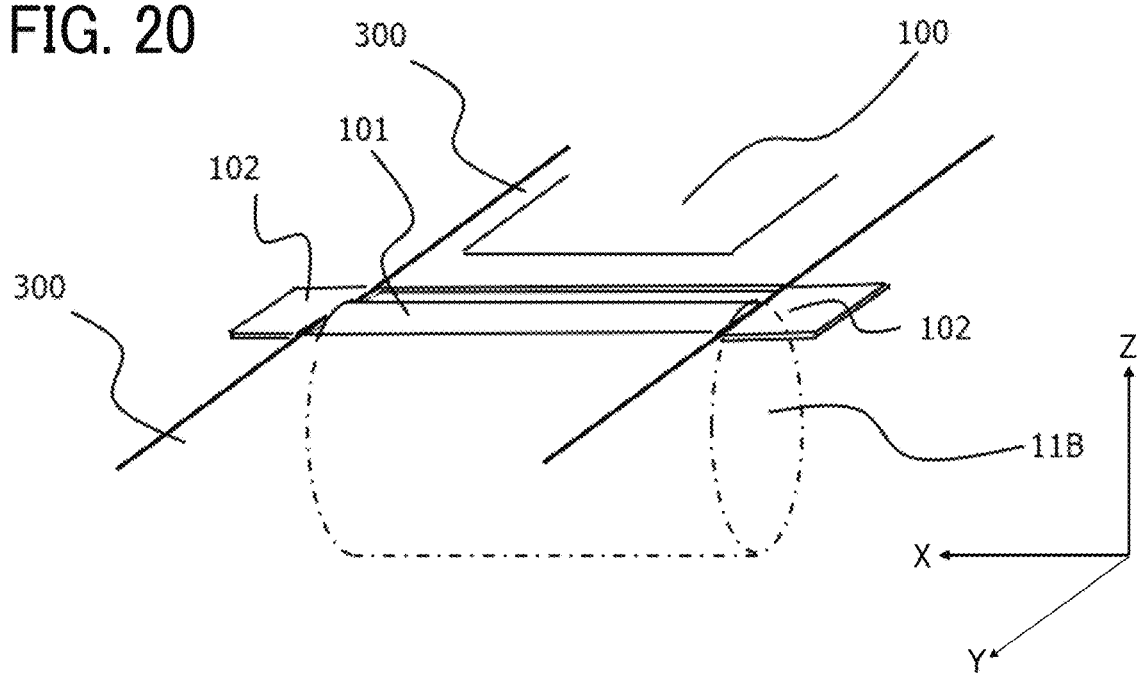
FIG. 20 is a diagram illustrating yet another hardware configuration of the image reading device.

Further, FIG. 20 is a diagram illustrating yet another hardware configuration of the image reading device 10.

As illustrated in FIG. 20, the second region 102 may be a member different from the conveyance guide 300.

As described above, the line sensor 12 may read a region including the first region 101 and the second region 102 simultaneously. On the other hand, the line sensor 12 may read the image by a plurality of readings.

For example, in a case in a case in which the sheet 100 is white and the outside line of the sheet 100 is grasped, the controller 13 switches the roller 11 to set the background to black to locate the black member 11B at the position illustrated in FIG. 1. As described above, in a case in which the image reading device 10 has a configuration in which the background is switchable according to the purpose to grasp the outline accurately and the type of the recording medium, the image reading device 10 grasps the outline of the sheet with good accuracy.

Note that the image reading device 10 may adjust the height of the second region 102 (at the position in the Z direction). For example, the image reading device 10 adjusts the height of the second region 102 so as to be substantially equal to the height of a recording medium.

Depending on the height, the read result of the image reading device 10 is likely to change due to the influence of light. In order to avoid this inconvenience, the image reading device 10 adjusts the height of the second region 102 to be equal to the height of the recording medium to be read, so as to perform the correction (end correction) with good accuracy.

In addition, when the sheet 100 is white and is brought to decrease the bleedthrough of an image on the sheet 100, the controller 13 switches the roller 11 so that switching the roller 11 makes the background black. As described above, in a case in which the image reading device 10 has a configuration that switches the background according to the purpose to the "bleedthrough" prevention and the type of the recording medium, the image reading device 10 decreases the "bleedthrough" of the recording medium to easily read an image with high image quality.

The image reading device 10 reads to generate a read value indicating light amount, brightness, and color. Specifically, the read value is in a form of, for example, RGB or YUV. Therefore, the light amount is converted from each value of RGB or is specified from a value indicated by, for example, "Y" (brightness value) of YUV, i.e., the read value. Collection of the read values, each being generated by pixel as described above, generates image data.

When performing correction (end correction), the image reading device 10 reads a part of the second region 102 in advance, and then generates a reference value. Note that the reference value is preferably obtained by reading a plurality of positions in the second region 102 and performing statistical processing, for example, averaging a plurality of read values.

For example, the line sensor 12 includes a mechanism that moves in the X direction differently according to a case of reading the sheet 100 and a case of generating a reference value. For example, the line sensor 12 includes a mechanism that moves in the X direction according to the purpose, by an actuator such as a motor.

On the other hand, the line sensor 12 may be set at a position at which both the first region 101 and the second region 102 are read or may have a sensing range of reading both the first region 101 and the second region 102. In such a case, the line sensor 12 is set in advance to use the line sensor 12 differently to sense depending on a case of reading the sheet 100 without physically moving in the X direction and a case of generating a reference value.

Example of Correction (End Correction) Due to Influence of Heat

The image reading device 10 corrects, for example, the following influence due to heat.

Figure 3:
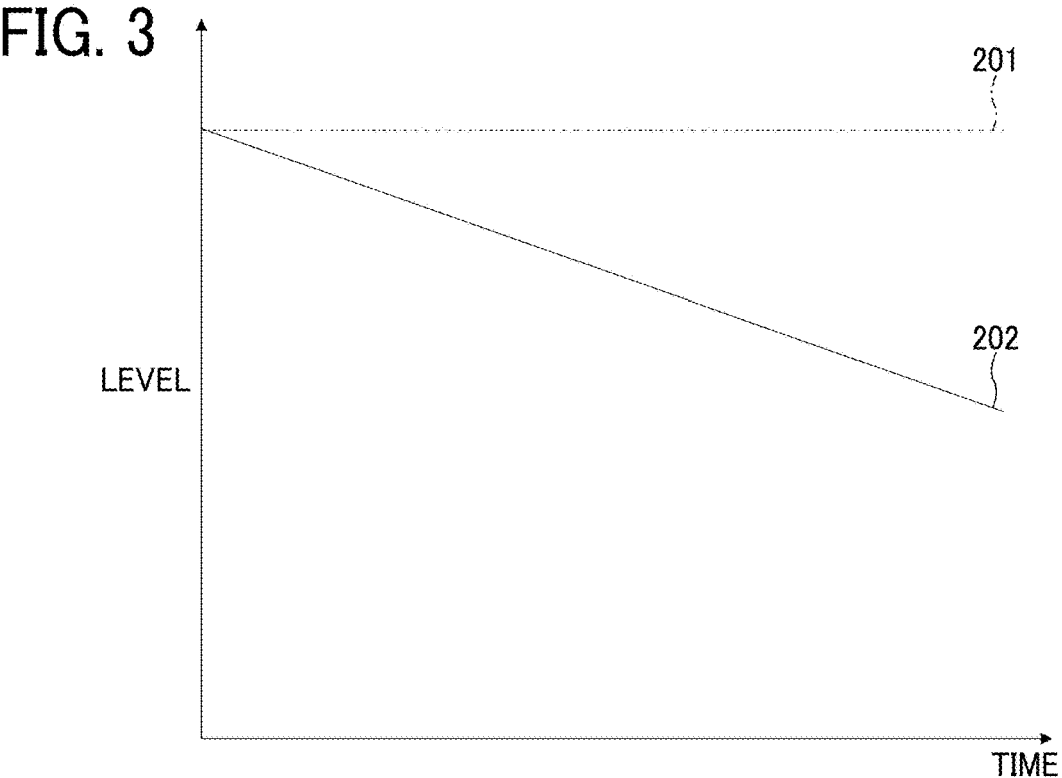
FIG. 3 is a graph illustrating a state in which an influence of heat is generated in illumination.

FIG. 3 is a graph illustrating a state in which an influence of heat is generated in illumination.

For example, when reading an image, the image reading device 10 has brightness with, for example, an illumination device with respect to the sheet 100 that functions as a reading target, so as to have a stable environment for reading the image. In such a case, for example, the following influence may occur due to heat.

In FIG. 3, the horizontal axis indicates "TIME" (for example, in a unit of "second(s)") and the vertical axis indicates "LEVEL" (a light amount to measure with a read value. For example, in a unit of dimensionless). Accordingly, FIG. 3 indicates that time elapses as the line of the graph moves to the right.

First, the read value ("LEVEL" in FIG. 3) ideally has no influence of heat. Therefore, even with the elapsed time, the read value remains substantially the same as in the state indicated by a broken line in the graph of FIG. 3. This state is referred to as an ideal state 201. Note that the ideal state 201 is based on the assumption that there is no change in, for example, the illumination condition and the subject of image. That is, as indicated as the ideal state 201, the light amount ideally maintains a constant value regardless of the elapsed time.

On the other hand, if there is an influence of heat on the read value, the light amount may tend to be, for example, as an actual state 202 that is indicated by a solid line in FIG. 3. Specifically, the value of the light amount may gradually decrease as the time elapses in the actual state 202. In the actual state 202, even though the same color is read in the same environment, the image reading device 10 generates the read value lower than the previous value due to the influence of heat.

Due to such an influence of heat, in a case in which the light amount varies, the read value is preferably corrected. The correction is, for example, the "shading" and the end correction.

The line sensor 12 has the read values of three colors, which are red (R), green (G), and blue (B). The variation of the light amount of each value due to heat may be different by color. Therefore, in the following correction, the correction value is calculated by each color (R, G, and B) to perform the correction.

First, the image reading device 10 stores a reference value in advance. That is, the image reading device 10 reads the second region 102 and stores the read value before the influence of heat occurs. The image reading device 10 then reads the white member 11W and performs the shading, so that uneven image density in the main scanning direction (X direction) is corrected. Since there is no influence of heat, the reference value is generated at this timing.

Here, the white member 11W is switched to perform the shading. Therefore, when the shading is performed between the preceding sheet and the subsequent sheet for each sheet, the interval between the preceding sheet and the subsequent sheet becomes longer due to the switching time of the white member 11W, and the productivity decreases. For this reason, the processing of the present disclosure is performed in order to restrain a decrease in light amount due to heat while reducing the frequency of the shading.

Therefore, the correction (end correction) is performed at the timing that the influence of heat occurs after the generation of the reference value and that the light amount is decreased. Alternatively, the correction (end correction) is performed at the timing that a certain amount of time has elapsed after the generation of the reference value and that the light amount is decreased due to various influences. As described above, the read value on which the correction (end correction) is performed is a read value generated after the influence of heat occurs.

Even after the time has elapsed, the second region 102 is maintained to have the same color. Therefore, the read value is ideally remained regardless of the elapsed time. Therefore, for example, the image reading device 10 performs the correction (end correction) such that the read value stored as the reference value (that is, the read value generated by reading the second region 102 before the time elapses) and the current read value (that is, the read value generated by reading the second region 102 after the time elapses) coincide with each other.

Specifically, the correction (end correction) is performed by using a parameter calculated as follows. This parameter is referred to as a "correction parameter". First, the image reading device 10 performs calculation such as the following Equation 1.

$$WB=(WBL+WBR)/2 \qquad \text{Equation 1.}$$

In Equation 1, "WB" represents a reference value. As indicated in Equation 1, the reference value WB is a result obtained by adding two read values, for example, "WM," (hereinafter, referred to as a "first advanced read value") and "WBR" (hereinafter, referred to as a "second advanced read value") and dividing the addition result, in other words, calculating the average of the first advanced read value "WBL" and the second advanced read value "WBR". Therefore, in a case in which three or more points are read, the reference value "WB" is a value obtained by calculating the average of three or more read values.

In Equation 1, each of the first advanced read value WBL and the second advanced read value WBR is a read value generated by reading the second region 102. Specifically, the first advanced read value is a read value obtained by reading the left end of the second regions 102 in FIG. 2. On the other hand, the second advanced read value WBR is a read value obtained by reacting the right end of the second regions 102 in FIG. 2. As described above, the reference value is calculated by executing the statistical processing, for example, by averaging the read values at both ends of the reading area. Such a reference value is stored in advance in the image reading device 10.

On the other hand, after the influence of heat occurs in the actual state 202, that is, in the state in which the light amount is decreased, the image reading device 10 performs the correction (end correction) on the read value by the correction parameter calculated with the following Equation 2.

$$P=WB/WA \qquad \text{Equation 2.}$$

"P" in Equation 2 represents a correction parameter. Specifically, in a case in which the image reading device 10 simultaneously reads regions including both the first region 101 and the second region 102, the correction parameter P is used for the correction (end correction) on the first region 101.

For example, in the second region 102, the read value before a decrease of the light amount is "200" and the read value after a decrease of the light amount is "190". In this case, the calculation is "P=200/190". The correction parameter P calculated as above is used for the correction (end correction) on the first region 101.

Further, "WA" in Equation 2 (referred to as a "current average value") is calculated as follows.

$$WA=(WAL+WAR)/2 \qquad \text{Equation 3.}$$

As described by Equation 3, the current average value WA is a read value generated by reading the same or similar color as in Equation 1 and calculated by executing the same or similar statistical processing, after the influence of heat occurred, that is, at a time to perform the correction (end correction).

Specifically, the first current read value WAL is a read value obtained by reading the second region 102, which is same as the first advanced read value WBL, after the influence of heat has occurred. Similarly, the second current read value WAR is a read value obtained by reading the second region 102, which is same as the second advanced read value WBR, after the influence of heat has occurred.

As the influence of heat occurs, the state varies as illustrated in FIG. 3 before and after occurrence of the influence. Therefore, even when the same color is read, the first current read value WAL is lower than the first advanced read value WBL. Similarly, the second current read value WAR is lower than the second advanced read value WBR.

Next, the image reading device 10 performs the correction (end correction) on the read value by the calculation with the following Equation 4, by the correction parameter P calculated with the above-described Equation 2, $$R = RP \times P \qquad \text{Equation 4.}$$

In Equation 4, "R" represents a value obtained after the read value is corrected. The value is referred to as a "correction value". On the other hand, "RA" represents a read value on which the correction (end correction) is performed. In other words, "RA" is a read value generated under the condition in which the value is decreased due to the influence of heat and before the correction (end correction) is performed. The value is referred to as a "target read value".

The reference value WB calculated by the above-described Equation 2 is obtained under the condition before the light amount is decreased. Therefore, the reference value WB is greater than the current average value WA obtained after the light amount is decreased. Therefore, the correction parameter P is 1 or greater by the calculation with Equation 2. Then, in Equation 4, the image reading device 10 calculates to multiply the target read value RA by the correction parameter P that is equal to or greater than 1. Accordingly, the correction parameter P is a gain value in the correction (end correction).

Therefore, in Equation 4, the correction value R is calculated to increase the target read value RA that has been decreased. As the (end correction) is performed as described above, the image reading device 10 performs the correction (end correction) on the variation due to heat as illustrated in FIG. 3 based on the correction parameter. Therefore, the image reading device 10 performs the correction (end correction) on the read value with good accuracy. As described above, as the correction (end correction) is performed with good accuracy, the image reading device 10 eventually performs the correction (end correction) on the read image with good accuracy.

Note that the correction (end correction) may be performed at a timing at which the image reading device 10 reads or may be performed after the reading and in the process of, for example, generating image data. Further, in a case in which contamination is produced due to paper dust or foreign material such as toner, it may be determined that the correction (end correction) is not performed.

For example, it is determined that contamination has occurred, based on the advanced setting in which the read value generated by reading the second region 102 is lower than the threshold that functions as a reference. Note that the threshold is stored in advance in the storing device (memory).

Further, when generating a correction value based on the read results on both sides, i.e., the second regions 102, in a case in which one of the read values is lower than the threshold, the image reading device 10 may determine that one of the second regions 102 has contamination. In this case, the image reading device 10 may perform the correction (end correction) by using the read value on the second region 102 having no contamination.

Example of Correction (End Correction) of Variation Due to Influence of Position For example, the read value may have the following tendency according to the position at which the image reading device 10 reads.

Figure 4:
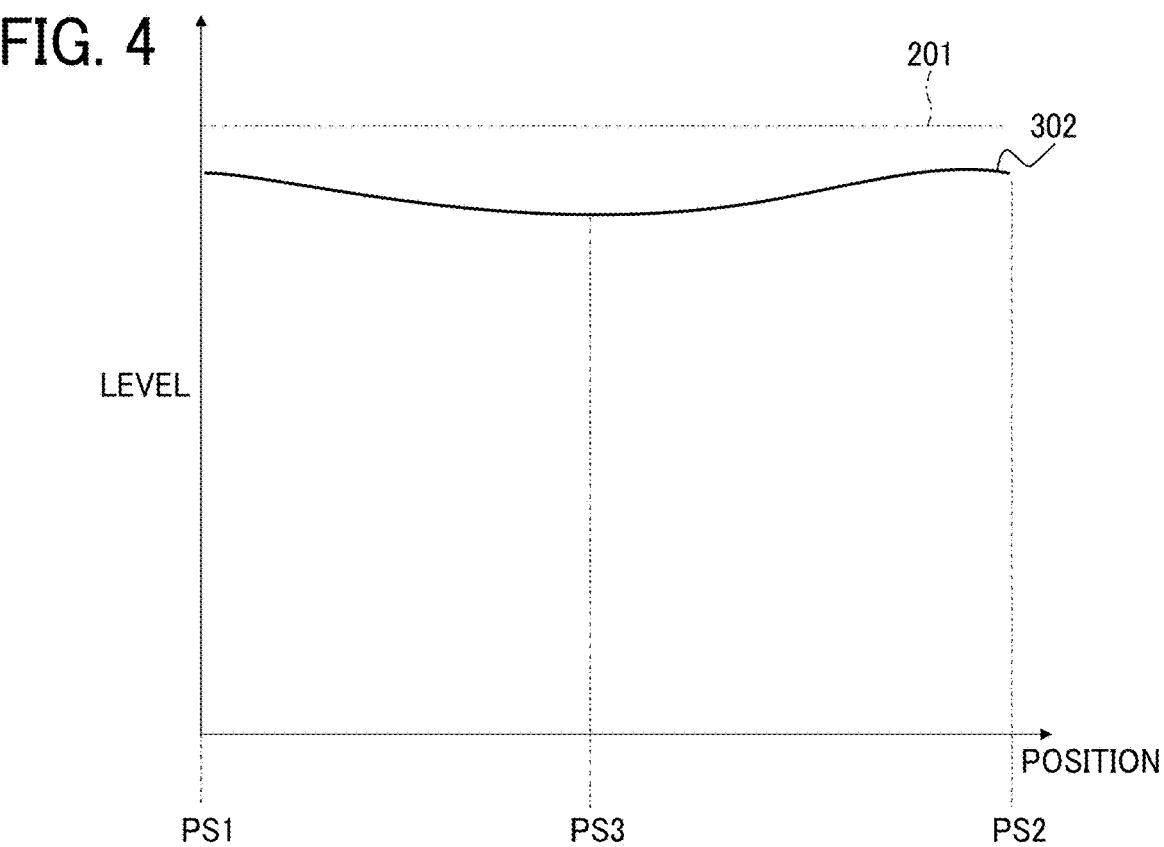
FIG. 4 is a graph illustrating a state in which an example of distribution of influence of heat in position.

FIG. 4 is a graph illustrating a state in which an example of distribution of influence of heat in position.

For example, the influence of heat distributes as illustrated in FIG. 4, according to the position that is indicated in the horizontal axis in FIG. 4. Hereinafter, the horizontal axis represents the "POSITION" and the vertical axis represents "LEVEL" in FIG. 4. Note that the vertical axis is same as FIG. 3. Note that, in the following example, the "position" is, for example, a position in the main scanning direction (in this example, the X direction). For example, the position is indicated by the number of pixels counted from one end of the first region 101 as a point of origin. Hereinafter, the one end of the first region 101 is the left end of the first region 101 in FIG. 2. The unit of pixel is, for example, a dot. Therefore, the first end PS1 is a position at the left end of the first region 101. On the other hand, the second end PS2 is a position at the right end of the first region 101.

First, in the ideal state 201, the influence of heat does not occur. Therefore, even with the position and the elapsed time, the read value remains substantially the same as in the state indicated by a broken line in the graph of FIG. 3. This state is referred to as an ideal state 201 as in FIG. 3.

On the other hand, in the actual state, an influence such as a positional influence 302 in FIG. 4 may occur depending on the position. Specifically, the positional influence 302 is an example in a case in which the influence of heat occurs more largely on the center PS3 than the first end PS1 and the second end PS2, each of which is the end portion.

In particular, as the time elapses, the influence may not occur uniformly depending on the position and variations may occur. For example, an illumination device has the following hardware configuration including a plurality of LEDs. In such an illumination device, an influence of heat may be biased depending on a position due to, for example, a physical interval at which the LED is mounted or a state in which heat is radiated.

For example, since the center PS3 is a central portion of the area in which the image reading device 10 reads the sheet, the center PS3 is better to be brighter than the first end PS1 and the second end PS2. In such a case, a larger number of LEDs may be disposed in the center PS3, than the first end PS1 and the second end PS2. In such an arrangement, the influence of heat on the center PS3 tends to increase as the time elapses. Therefore, the positional influence 302 tends to occur while being biased at a specified portion depending on the position.

An example of the positional influence 302 represents a case in which the light amount in the center PS3 is lower than the first end PS1 and the second end PS2 as the time elapses.

The tendency of the positional influence 302 depends on, for example, the layout of the LEDs in the illumination device. Therefore, once the layout of the LEDs is determined, the correlation between the reading position and the variation of the read value with respect to the position is estimated.

Based on the correlation estimated as described above, the correction (end correction) is performed, for example, with the following Equation 5. Next, a description is given of an example in which the image reading device 10 performs the correction (end correction) on the reading of the Nth sheet ("N" is any number) with reference to the first sheet (that is, a sheet in a state close to the initial state). Note that, in this example, the image reading device 10 reads a single target sheet each time and the "Nth" sheet represents the "Nth" time.

$$R = RA \times P2 \qquad \text{Equation 5.}$$

Similar to Equation 4 described above, "R" in Equation 5 represents a correction value. In this example, "R" indicates a value after the correction (end correction) is performed on the read value of the "Nth" sheet.

Further, "RA" is a target read value in Equation 5. In this example, "RA" is the read value of the "Nth" sheet and indicates a value before the correction (end correction).

"P2" is a correction parameter in Equation 5. Then, as indicated by Equation 5, the correction (end correction) is achieved by multiplying the target read value "RA" by the correction parameter "P2" according to the correlation.

The correction parameter "P2" is a value calculated, for example, with the following Equation 6.

$$P2 = (R1/Rn) \times PP \qquad \text{Equation 6.}$$

In Equation 6, "R1" is a read value of, for example, the first sheet and of the end portion such as the first end PS1 and the second end PS2. Hereinafter, the read value "R1" is referred to as a "reference read value". That is, the reference read value "R1" is a value obtained before the influence of heat occurs.

Further, the reference read value R1 is preferably a value of a position, e.g., the end portion, at which the influence of heat is less likely to occur.

The example described below is to perform the correction (end correction) to which the position is considered with the reference read value R1 as a reference. However, a read value read at another position that is different from the above-described position may be a reference read value and the correction (end correction) may be performed based on the reference read value. For example, the reference read value R1 is read and stored at a position set in advance, and is referred to, for example, when the correction (end correction) is performed.

Further, the reference read value R1 may be, for example a mean value obtained by reading a plurality of positions.

In Equation 6, "RN" is a read value of, for example, the Nth sheet and of the end portion such as the first end PS1 and the second end PS2. Hereinafter, the read value "RN" is referred to as an "influence occurrence read value".

The influence occurrence read value RN is a read value obtained at the same position as the reference read value R1. On the other hand, the influence occurrence read value RN is targeted at the Nth sheet, which is different from the reference read value R1.

For example, in a casein which the influence of heat occurs as illustrated in FIG. 4, the reference read value R1 is a value indicated, for example, by the ideal state 201 in the first end PS1. On the other hand, the influence occurrence read value RN is a value indicated by the positional influence 302. As described above, when the influence of heat occurs, the light amount at the same position is lower in the Nth sheet than in the first sheet.

In Equation 6, "PP" represents a coefficient used for the correction (end correction) on the influence according to the reading position. The coefficient is referred to as a "position correction coefficient". For example, as the center PS3 in FIG. 4, when compared with the end portion (that is, a reference position that is read with the reference read value R1), the position correction coefficient PP is set to be greater than "1", for example, "1.1", with respect to the position having a large variation due to heat.

As described above, the position correction coefficient PP is set according to the correlation of the position in FIG. 4 and the variation of the read value with respect to the position. Therefore, by using the position correction coefficient PP, the correction (end correction) is performed differently at each position. Accordingly, the correction (end correction) is performed on the read value with good accuracy.

As indicated in Equation 6, the correction parameter P2 is calculated by multiplying the position correction coefficient PP. Accordingly, the correction parameter P2 is a value that reflects the correlation of the reading position and the variation of the read value with respect to the reading position.

Specifically, when the correction (end correction) is performed with a calculation by multiplying the correction parameter P2, since the position correction coefficient PP is, for example, 1.1, the correction (end correction) is performed on the read value of the center PS3 (that is, the target read value RA in Equation 5) to obtain a greater value.

As described above, the correction parameter is preferably a value that reflects the correlation of the reading position and the variation of the read value with respect to the reading position. As the correction parameter in consideration of such a position is used for the correction (end correction), the image reading device 10 performs the correction (end correction) that considers the characteristics of the position by each position.

For example, the correlation is estimated as follows.

Figure 5:
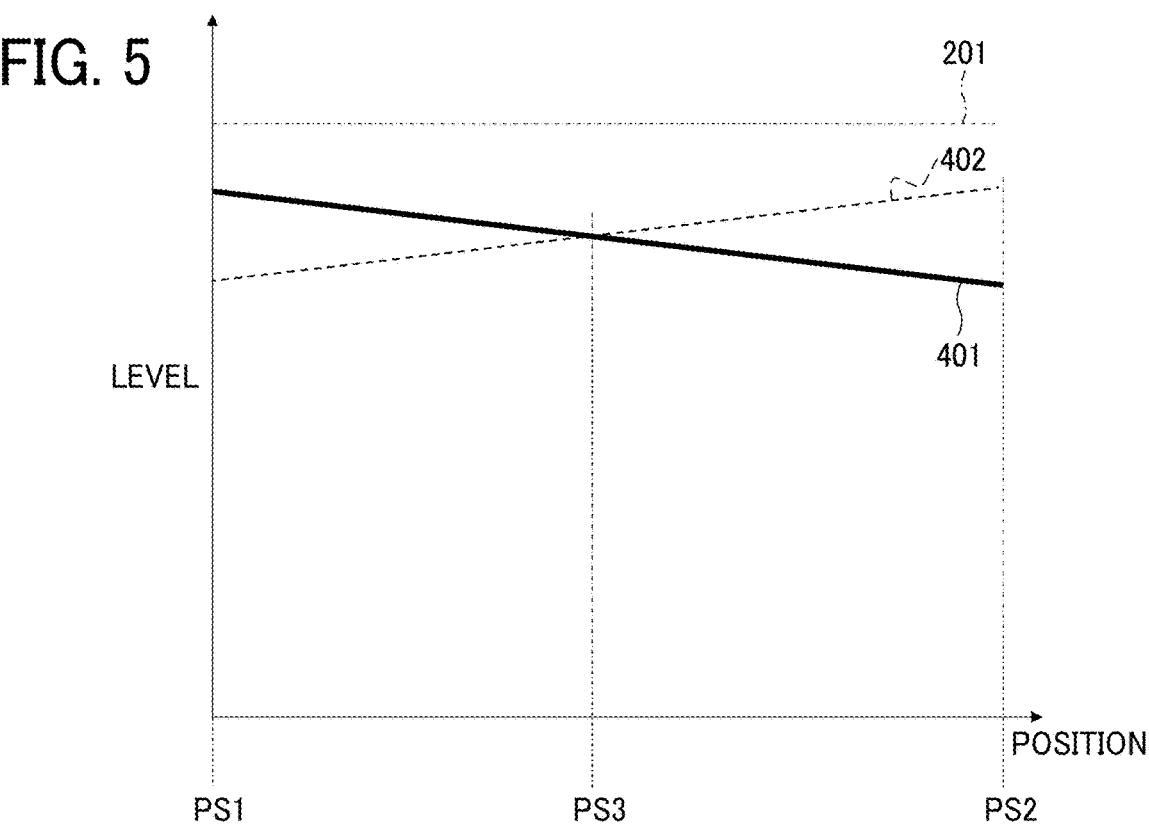
FIG. 5 is a graph illustrating a first example of correlation and correction (end correction)

FIG. 5 is a diagram illustrating a first example of the correlation and the correction (end correction).

Hereinafter, the light amount has correlation between the level and the position, which sharply decreases from the first end PS1 (for example, the left end portion) toward the second end PS2 (for example, the right end portion).

In this example, a correlation 401 is estimated under an assumption that the correlation 401 is linear, for example. Specifically, the correlation 401 indicates the tendency that the light amount decreases according to the position (from left to right, in this example).

Note that the following description describes an example with continuous values but the values and calculations may be discrete.

For example, the light amount of the first end PS1 decreases by "0.5%". By contrast, the light amount of the second end PS2 decreases by "1.5%". Accordingly, it is thought that the light amount has a tendency in which the value decreases toward the position farther away from the first end PS1.

In such a tendency, for example, the correlation 401 is estimated by calculation of a straight line connecting the read value of the first end PS1 and the read value of the second end PS2. Specifically, the correlation 401 is calculated by a method such as a least squares method.

When the correlation 401 is estimated, a position correction coefficient PP is calculated as in a correction equation 402, for example. For example, the correction equation 402 is calculated to have the tendency opposite the tendency of the correlation 401 so as to perform correction (end correction) on the influence of the position estimated by the correlation 401.

Specifically, the correction equation 402 is calculated so that the value increases as the correction equation 402 is located at a position farther away from the first end PS1. Then, the position correction coefficient PP is set based on, for example, the correction equation 402. By using such a position correction coefficient PP, in a case in which correction (end correction) is performed by calculation of the above-described equation 5, correction (end correction) is performed to correct the influence on the position such as the correlation 401.

The image reading device 10 is, for example, a contact image sensor (CIS). The CIS is a device integrally including an optical component such as a lens and an optical sensor and an illumination device that functions as a light source such as an LED.

Such a CIS may have a configuration in which an LED functioning as a heat source is located at a left end of the sheet and another LED is located at a right end of the sheet. In such a configuration, the light amount at the center of the sheet is the addition of light emissions by the LED at the left end and the LED at the right end.

The LED at the left end is different from the LED at the right end. Further, the LED at the left end and the LED at the right end have the characteristic difference from each other. Such a characteristic difference is generated in the main scanning direction, that is, the left and right directions.

For example, in a case in which the LED at the right end has the characteristic difference to be lower in the light amount than the LED at the left end, there is the tendency such as the correlation 401 illustrated in FIG. 5. In order to cancel such a tendency, it is preferable to perform correction (end correction) in consideration of the positional relation as the correction equation 402.

Note that estimation and correction (end correction) of the correlation may be performed for example, by sections as follows.

Figure 6:
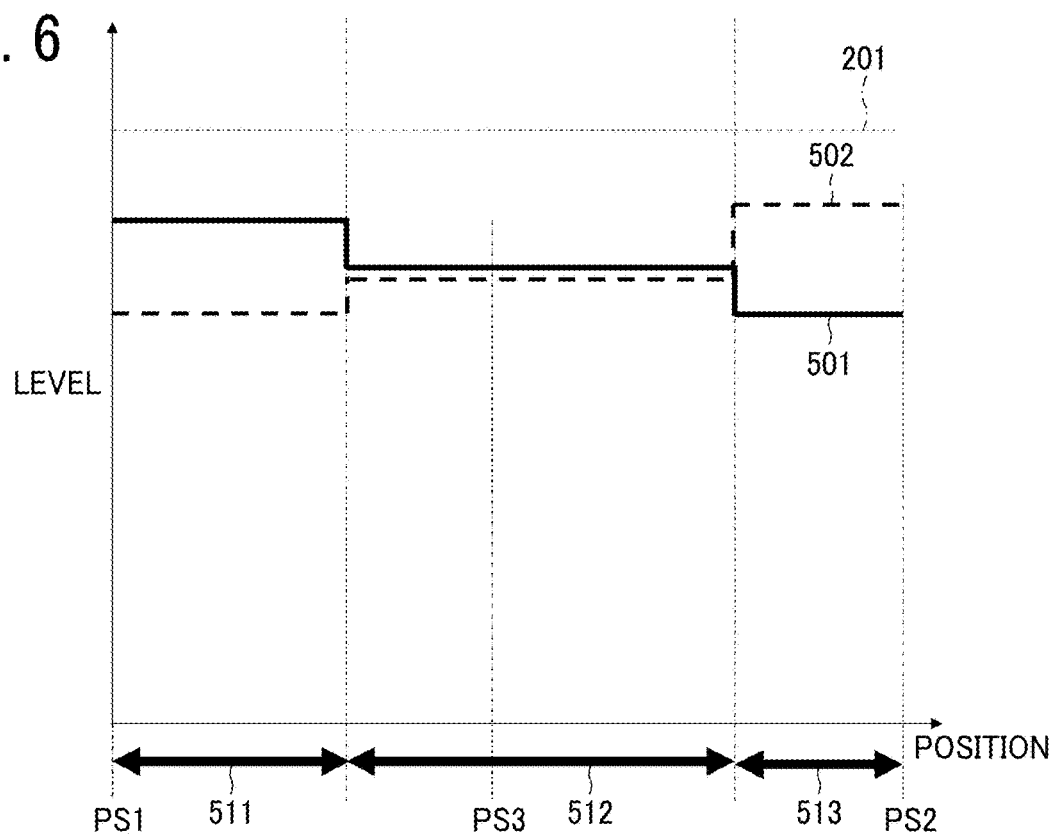
FIG. 6 is a graph illustrating a second example of correlation and correction (end correction)

FIG. 6 is a diagram illustrating a second example of the correlation and correction (end correction).

The following example in FIG. 6 illustrates a case in which the influence of heat is generate as illustrated in FIG. 5. That is, as in the example in FIG. 5, the following example in FIG. 6 indicates a correlation having the tendency in which the light amount sharply decreases from the first end PS1 (for example, the left end portion) toward the second end PS2 (for example, the right end portion).

Here, a description is given of an example in which the sheet area is divided into three sections in the X direction. Note that the settings of, for example, the number of sections, the ranges of the sections, and whether the ranges of the sections are equal to each other are set in advance by, for example, a user.

A first segment 511 is mainly the left side segment in the X direction (i.e., an example of a segment including the first end PS1).

A second segment 512 is mainly the center segment in the X direction (i.e., an example of a segment including the center PS3).

A third segment 513 is mainly the right side segment in the X direction (i.e., an example of a segment including the second end PS2).

A segmental correlation 501 is estimated to be different for each of the first segment 511, the second segment 512, and the third segment 513, for example.

Based on the segmental correlation 501, a correction value 502 is set for each segment. In other words, as in FIG. 5, the correction value 502 in FIG. 6 is calculated to cancel the tendency estimated by the segmental correlation 501.

As described above, estimation and correction (end correction) may be performed in a unit of segment. For example, the process of estimation and correction (end correction) is performed in a finer unit in a case in which the unit is pixel, than a case in which the unit is segment. Therefore, the calculation tends to be complicated, and the amount of data also tends to be large. Accordingly, each segment is set in a unit of a collection of pixels. As described above, the process such as estimation and correction (end correction) is performed in a unit of segment, the computation load is reduced.

Note that a segment is not limited to the above-described example of the first segment 511, the second segment 512, and the third segment 513. For example, each segment may be equally divided. On the other hand, the tendency of, for example, the light amount is measured in advance the segment may be set by measuring the tendency of, for example, the light amount in advance and allocating by each range having similar tendencies.

Further, correction (end correction) is preferably performed, for example, at a regular basis. For example, the correction (end correction) described with reference to FIG. 4 or FIG. 5 is preferably executed by time set in advance at a regular basis.

Figure 7A:
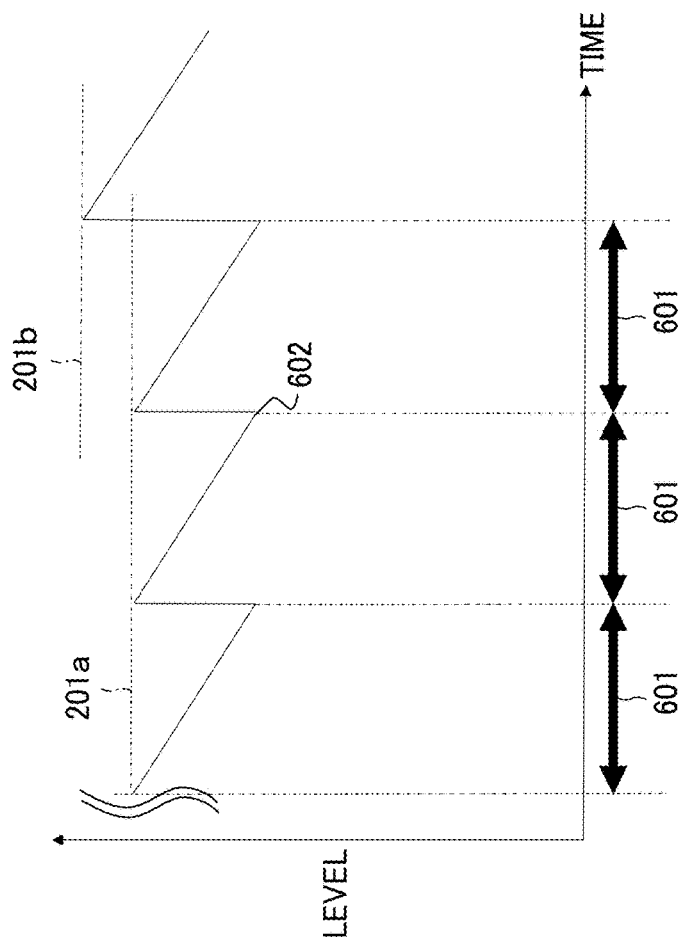
FIGS. 7A and 7B are graphs, each illustrating an example of regular correction (end correction)

FIG. 7A is a graph of an example of correction (end correction) at a regular basis.

For example, as in the graph of FIG. 3, the graph of FIG. 7A indicates an example of a case in which the light amount decreases due to an influence of heat as the time elapses. The ideal state 201 in FIG. 7A is the same as the ideal state 201 in FIG. 3.

First, an interval at which correction (end correction) is performed is set in advance. This interval is indicated as a "correction interval 601" in FIG. 7A, When the correction interval 601 is set in this manner, the correction (end correction) is performed each time the correction interval 601 elapses. Note that the correction interval 601 is not limited to the time and may be the number of recording media to be processed or the amount of processed data. For example, in a case in which the correction interval 601 is set in a unit of time, the time is measured, for example, by a timer. After the time of the correction interval 601 is counted, the image reading device 10 performs correction (end correction).

After the correction (end correction) is performed, a read value 602 indicates a value close to the ideal state 201. Then, after completion of the correction (end correction), the read value 602 tends to decrease again due to the influence of heat. When the value has decreased by a certain amount, the correction interval 601 is set based on an estimated time. As described above, as the correction (end correction) is performed by each correction interval 601, the image reading device 10 performs correction (end correction) on the read value 602 at a regular basis to read with good accuracy.

Further, correction (end correction) is preferably performed, for example, at a regular basis. For example, the correction (end correction) described with reference to FIG. 4 or FIG. 5 is preferably executed by time set in advance at a regular basis.

Figure 7B:
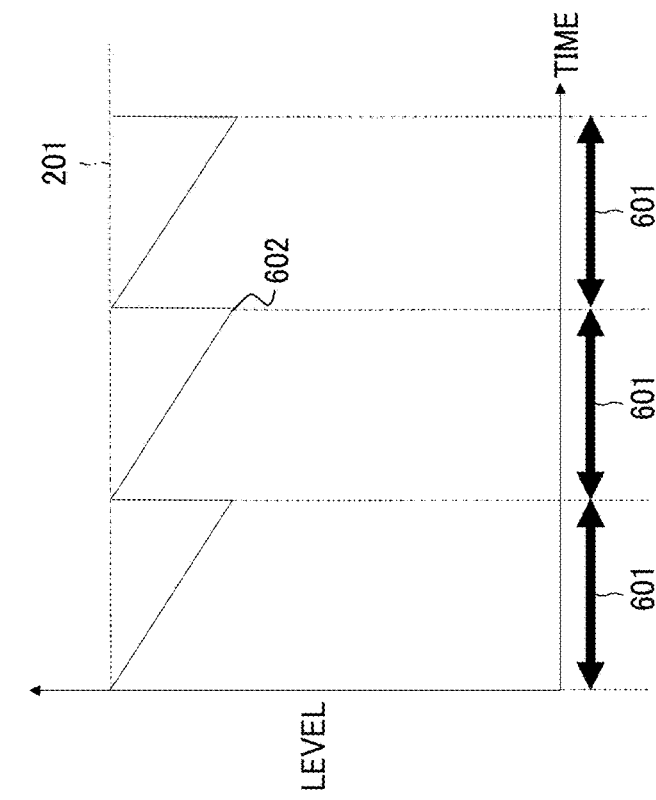

FIG. 7B is a graph of another example of correction (end correction) at a regular basis.

As in the graph of FIG. 7A, the graph of FIG. 7B indicates an example of a case in which the light amount decreases due to an influence of heat as the time elapses. Further, the graph of FIG. 7B is different from the graph of FIG. 7A, in other words, while the ideal state 201 of FIG. 7A includes the ideal state 201 of FIG. 7A, the ideal state 201 of FIG. 7B includes two ideal states, which are an ideal state 201*a* by the end correction and an ideal state 201*b* by the shading.

First, an interval at which an end correction is performed ("correction interval 601" in FIG. 7B) and an interval at which a shading is performed are set in advance. The interval at which a shading is performed may be set as an integral multiple of the correction interval 601 or may be set as the number of times of end corrections. When the correction interval 601 is set in this manner, the correction (end correction) is performed each time the correction interval 601 elapses.

After the end correction is performed, the read value 602 indicates a value close to the ideal state 201*a* of the end correction. Then, after completion of the correction (end correction), the read value 602 tends to decrease attain due to the influence of heat. When the read value 602 has decreased by a certain amount, the correction interval 601 is set based on an estimated time. Here, since the correction (end correction) mainly uses the end portions, the read value of an area other than the end portion gradually shifts from the read value obtained by the correction (end correction) of the entire main scanning area by the shading, and therefore the state of the correction (end correction) is not thoroughly ideal in the long term. In order to avoid this inconvenience, each time the end correction is performed by a predetermined number of times, the white member 11W is read to perform the shading. By so doing, the read value 602 becomes the ideal state 201*b* as illustrated in FIG. 7B. As described above, as the shading is performed each time the end correction is performed by the predetermined number of times, the image reading device 10 performs the correction (end correction) on the read value at a regular basis to perform the reading with good accuracy.

Note that the correction (end correction) is not limited to the influence of heat and the variation with respect to the position and may be, for example, a process to correct deterioration over time.

Second Embodiment

For example, the image reading device 10 may execute the overall processing as described below.

Figure 8:
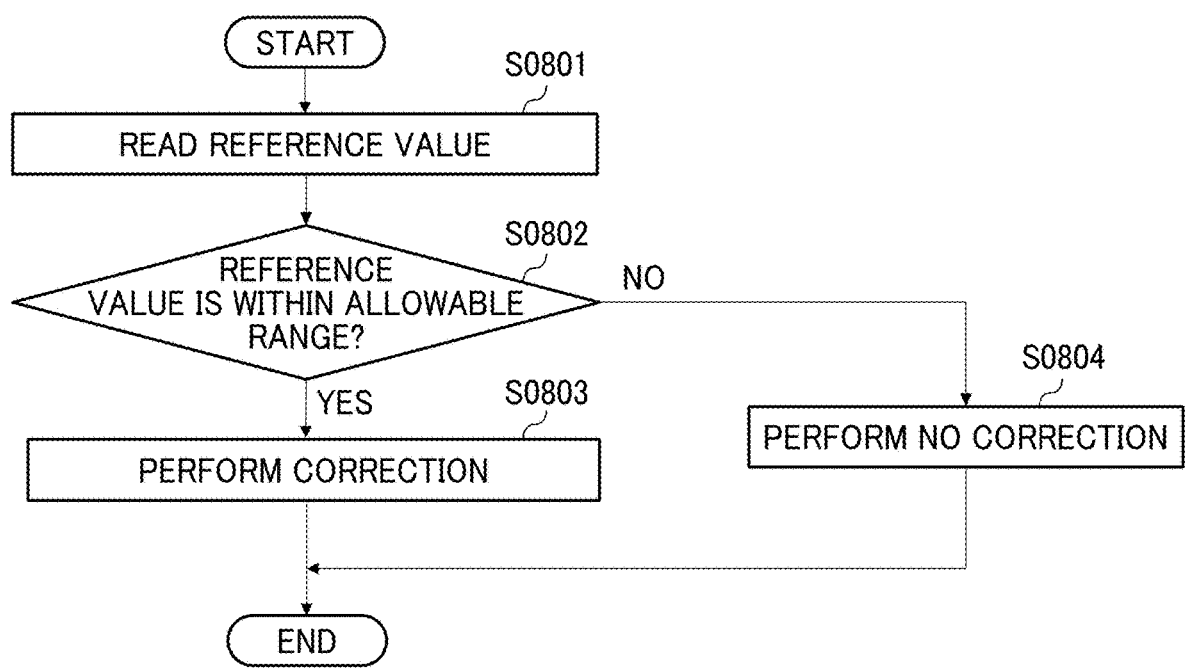
FIG. 8 is a flowchart of a first example of an overall processing executed by the image reading device.

FIG. 8 is a flowchart of a first example of the overall processing executed by the image reading device 10.

In step S0801, the image reading device 10 reads a reference value. For example, the image reading device 10 reads both the left end portion and the right end portion in FIG. 2 to obtain a reference value. Specifically, in a case in which both the first region and the second region are the reading range, the image reading device 10 extracts the reading result of a part corresponding to the left end portion and the right end portion in the reading range to generate the reference value. As described above, the reference value and the read value may be venerated either by the reading result of the target position or by extracting the reading result of the target position.

In step S0802, the image reading device 10 determines whether the reference value is within the allowable range. For example, in a case in which the image reading device 10 performs a plurality of readings for the reference value as in step S0801, if any value is out of the allowable range, the image reading device 10 determines that the reference value is not within the allowable range (NO in step S0802).

Note that the allowable range is set in advance. For example, the allowable range is prepared in a form of setting the upper and lower limits of the read value or in a form of setting the rate of the allowable range with respect to a value to be set (for example, in a form of a relative value).

For example, dust may adhere to a position at which the reference value is read. In such a case, the reference value indicates an abnormal value due to dust. If such a reference value is used, the correction (end correction) may be performed to worsen the accuracy of reading, for example, a recording medium.

In order to avoid this inconvenience, the allowable range of the reference value is set in advance. Accordingly, as long as the reference value is within the allowable range, it is preferable that the reference value is determined to be a normal value and is used for the correction (end correction).

Next, when the reference value is within the allowable range (YES in step S0802), the image reading device 10 proceeds to step S0803. On the other hand, when the reference value is out of the allowable range (NO in step S0802), the image reading device 10 proceeds to step S0804.

In step S0803, the image reading device 10 performs correction (end correction). That is, the image reading device 10 performs correction (end correction) based on the reference value generated in step S0801.

In step S0804, the image reading device it) does not perform correction (end correction). That is, the image reading device 10 does not perform correction (end correction) according to the determination result that the reference value generated in step S0801, so as to invalidate the correction (end correction). Note that, in such a case, an abnormal state is generated due to dust, for example. Accordingly, the determination result that an abnormal state is generated may be informed to, for example, a user or a service representative.

Accordingly, the overall processing is preferable to determine whether or not the correction (end correction) is performed on the read value, according to whether the read value is within the allowable range or out of the allowable range. Such overall processing invalidates the correction (edge correction) based on an inappropriate reference value due to the influence of dust, for example, so that excessive correction (end correction) is prevented.

Further, in a case in which the reference value is generated by reading a plurality of positions, the overall processing may be as follows.

Figure 9:
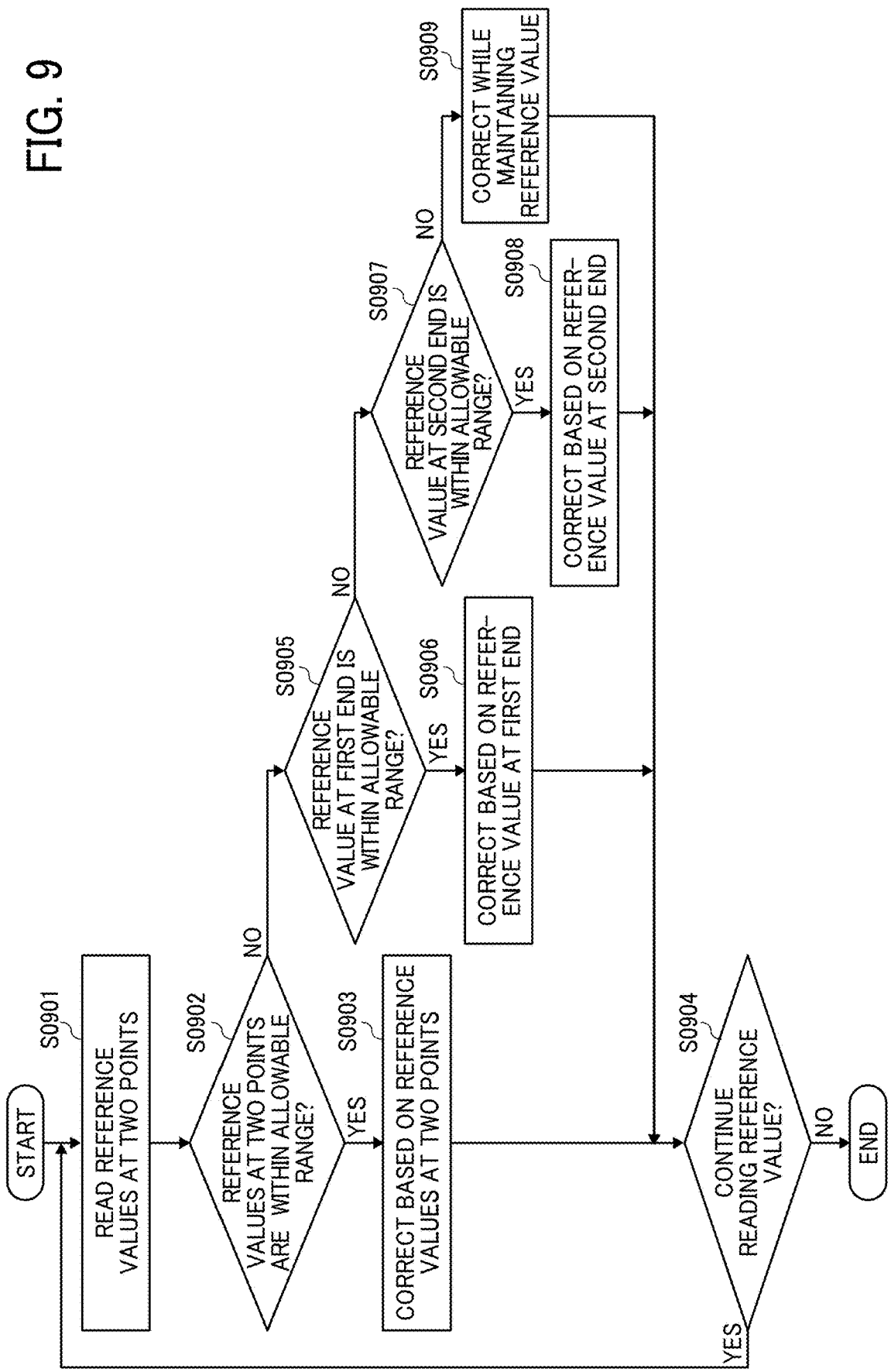
FIG. 9 is a flowchart of a second example of an overall processing executed by the image reading device.

FIG. 9 is a flowchart of a second example of the overall processing executed by the image reading device 10.

Hereinafter, a description is given of an example of reading for generating reference values at two positions (i.e., the left end portion and the right end portion in this example). Further, the overall processing may, for example, execute the processes described in the flowchart of FIG. 8, on the first sheet, and the processes described in the flowchart of FIG. 9, on the Nth sheet after the first sheet. The following description is given of an example of processing targeting on the second and subsequent sheets.

In step S0901, the image reading device 10 reads two reference values. For example, the image reading device 10 performs the same process as the process in step S0801 in the flowchart of FIG. 8.

In step S0902, the image reading device 10 determines whether or not the two reference values are within the allowable range. For example, the image reading device 10 performs the same process as the process in step S0802 in the flowchart of FIG. 8.

Next, when the two reference values are within the allowable range (YES in step S0902), the image reading device 10 proceeds to step S0903. On the other hand, when at least one of the two reference values is not within the allowable range (NO in step S0902), the image reading device 10 proceeds to step S0905.

In step S0903, the image reading, device 10 performs correction (end correction) based on the two reference values generated in step S0901. That is, since it is determined in step S0902 that the two read values are normal values within the allowable range, the two read values are used to determine the reference value. For example, the reference value is determined by averaging the read values at two points.

In step S0904, the image reading device 10 determines whether or not to continue reading the sheet.

Then, when the sheet is continuously read (YES in step S0904), the image reading device 10 proceeds to step S0902. On the other hand, when the sheet is not continuously read (NO in step S0904), the image reading device 10 ends the overall processing executed by the image reading device 10 in the flowchart of FIG. 9.

In step S0905, the image reading device 10 determines whether or not the reference value of the first end PS1 is within the allowable range. In other words, of the read values generated in step S0901, the image reading device 10 determines whether the reference value at the left end portion that is an example of the first end PS1 is within the allowable range.

Next, when the reference value of the first end PS1 is within the allowable range (YES in step S0905), the image reading device 10 proceeds to step S0906. On the other hand, when the reference value of the first end PS1 is out of the allowable range (NO in step S0905), the image reading device 10 proceeds to step S0907.

In step S0906, the image reading device 10 performs correction (end correction) based on the reference value of the first end PS1. In other words, based on the determination result of step S0905 that, of the two read values, the reference value of the first end PS1 is a normal value within the allowable range, the image reading device 10 uses the read value of the first end PS1 for determining the reference value.

In step S0907, the image reading device 10 determines whether or not the reference value of the second end PS2 is within the allowable range. In other words, of the read values generated in step S0901, the image reading device 10 determines whether the reference value at the right end portion that is an example of the second end PS2 is within the allowable range.

Next, when the reference value of the second end PS2 is within the allowable range (YES in step S0907), the image reading device 10 proceeds to step S0908. On the other hand, when the reference value of the second end PS2 is out of the allowable range (NO in step S0907), the image reading device 10 proceeds to step S0909.

In step S0908, the image reading device 10 performs correction (end correction) based on the reference value of the second end PS2. In other words, based on the determination result of step S0907 that, of the two read values, the reference value of the second end PS2 is a normal value within the allowable range, the image reading device 10 uses the read value of the second end PS2 for determining the reference value.

In step S0909, the image reading device 10 performs correction (end correction) while maintaining the reference value. In other words, since the read value generated in step S0901 is not within the allowable range, the image reading, device 10 determines that the reference value of the first sheet, for example, is the reference value. Note that the image reading device 10 may determine not to perform correction (end correction) in step S0909. According to the above-described processing, the image reading device 10 invalidates abnormal values.

Note that the processing, for example, determination on whether or not the reference value is within the allowable range and decision of the reference value according to the determination result is not limited to the order that the process on the first end is followed by the process on the second end. In other words, the overall processing may not be executed by following the order of the flowchart of FIG. 8 or FIG. 9.

As described above, when reading the sheet at a plurality of points, the image reading device 10 preferably uses the reference value within the allowable range, of the plurality of reference values. In other words, the image reading device 10 does not use a read value that is out of the allowable range and is abnormally larger or smaller when determining the reference value. As described above, as the reference value is determined based on the read value that is a normal value within the allowable range, the image reading device 10 performs correction (end correction) with good accuracy.

Variation

For example, the processing such as correction (end correction) may be performed by a unit divided as follows.

Figure 10:
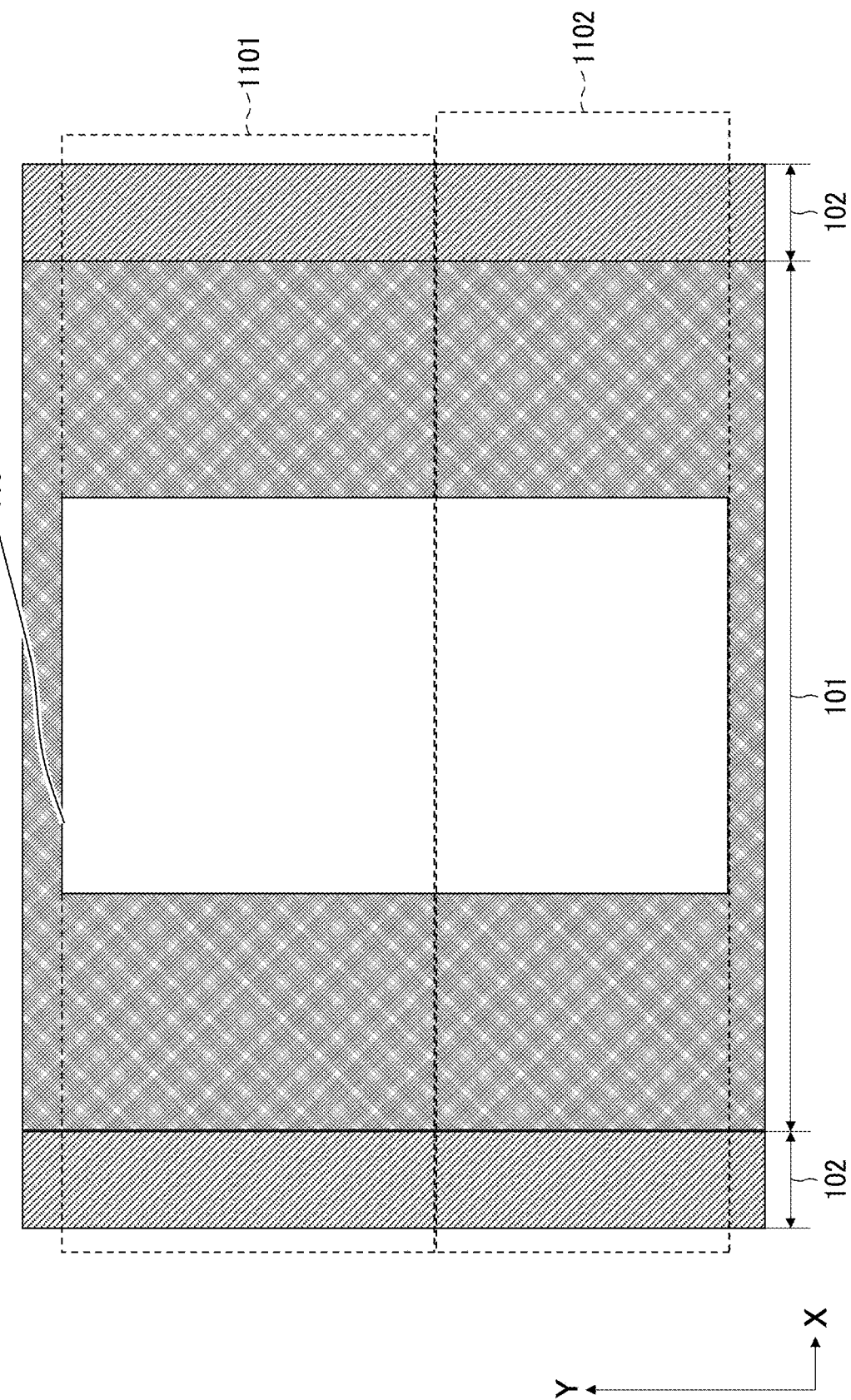
FIG. 10 is a diagram illustrating a first example of correction on divided regions.

FIG. 10 is a diagram illustrating a first example of performing correction (end correction) with respect to the divided regions.

For example, a description is given of an example in which the sheet is a cut sheet 110.

The recording medium is a cut sheet 110, which may be in particular referred to as a long sheet having a long dimension. Specifically, the cut sheet 110 has a dimension of, for example, 700 millimeters (mm) or 1260 millimeters (mm). In such a long recording medium having a dimension of 700 mm or more, the light amount is more likely to occur in the processing on, in particular, the trailing end of the sheet, when compared with the processing on the leading end of the sheet. In order to avoid this inconvenience, divided regions are preferably set even on one recording medium to perform the correction (end correction). In other words, the correction (end correction) may be performed for a plurality of times on a recording medium.

Note that the divided regions are specified by, for example, setting the length of one divided region in advance. Alternatively, there may be three or more divided regions. That is, the divided regions may be generated by dividing a recording medium into smaller regions than the regions illustrated in FIG. 10 to set more divided regions including a third divided region or more.

For example, the divided regions are set in advance into a first divided region 1101 and a second divided region 1102 and the image reading device 10 performs the correction (end correction) and the generation of the reference value separately in the first divided region 1101 and the second divided region 1102. With such a configuration having the above-described divided regions, even a long recording medium performs correction (end correction) with good accuracy.

Similarly, in a case in which the recording medium is a continuous form, the processing such as the correction (end correction) may be performed by a unit of each divided region as described below. The continuous form may also be referred to as, for example, "continuous form", "continuous paper", "LP paper", "form paper", or "fanfold paper". Note that the continuous form may also be a "Z sheet".

Figure 11:
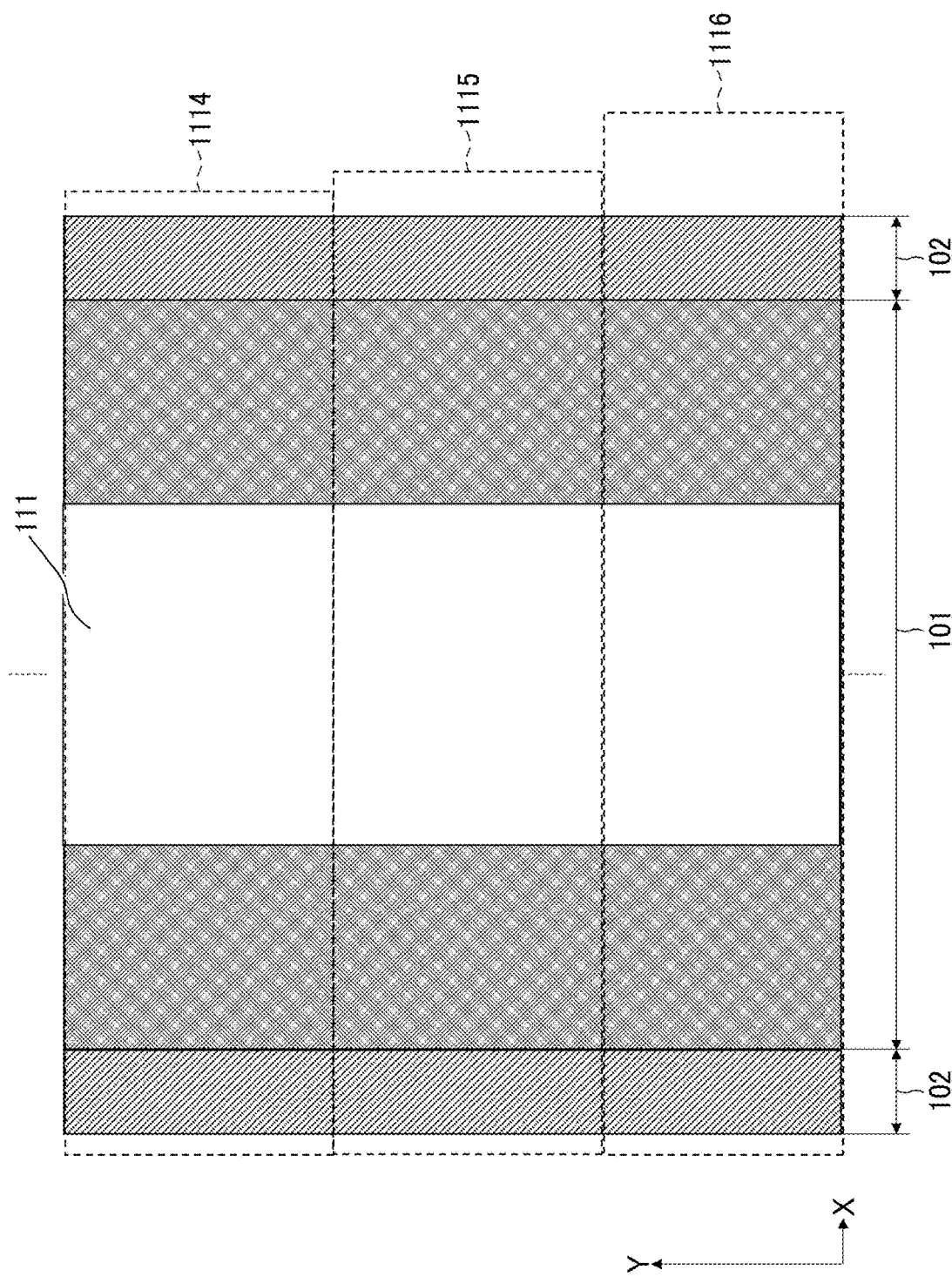
FIG. 11 is a diagram illustrating a second example of correction on divided regions.

FIG. 11 is a diagram illustrating a second example of performing correction (end correction) with respect to the divided regions.

For example, a description is given of an example in which the sheet is a continuous form 111.

When compared with the cut sheet 110, the continuous form 111 is likely to have longer intervals of cuts or have no cuts. Therefore, the continuous form 111 is set in advance to be divided by predetermined units.

The predetermined unit is determined by, for example, a time for conveying the recording medium, a length of the recording medium, or each image.

Specifically, in FIG. 11, the divided regions are set to, for example, a fourth divided region 1114, a fifth divided region 1115, and a sixth divided region 1116. That is, the correction (end correction) is performed for each divided region in the fourth divided region 1114, the fifth divided region 1115, and the sixth divided region 1116. As described above, the divided region is a unit for generating the reference value and a unit for performing the correction (edge correction). With such a configuration using the above-described divided regions, the correction (end correction) is performed even on a recording medium such as a continuous form, with good accuracy.

Example of Image Forming Apparatus

Figure 12:
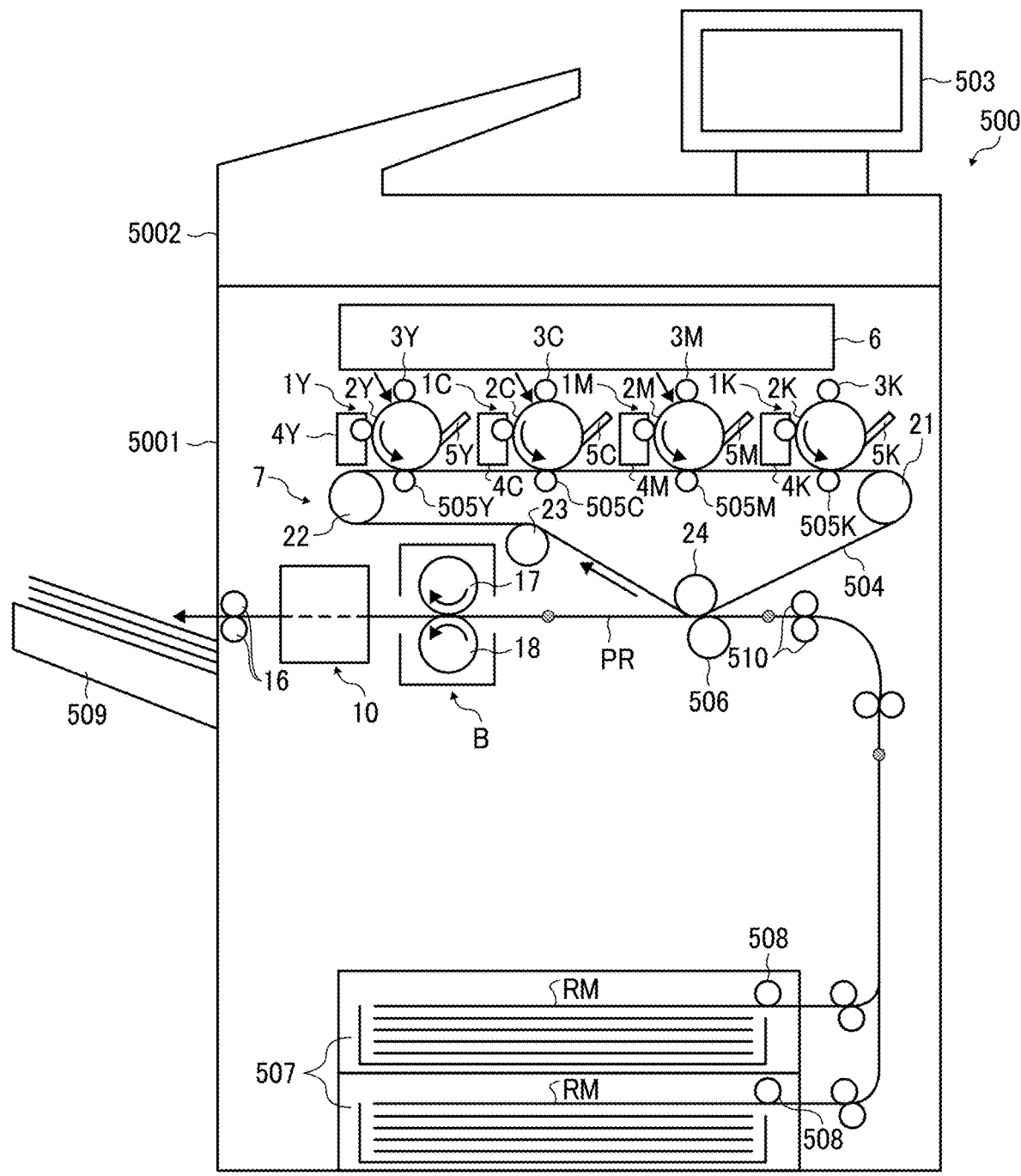
FIG. 12 is a diagram illustrating a configuration of an image forming apparatus according to an embodiment of the present disclosure.

FIG. 12 is a diagram illustrating a configuration of an image forming apparatus 500.

The image forming apparatus 500 is, for example, an electrophotographic color copier. Now, a description is given of the image forming apparatus 500 that is a copier.

The image forming apparatus 500 includes, for example, an image reading device and a sheet conveying device. Further, the image forming apparatus 500 includes, for example, an image forming device, a sheet conveyor, and the image reading device 10.

Specifically, the image forming device forms an image on a recording medium RM of a sheet type. The sheet conveyor conveys the recording medium RM after the fixing operation. The image reading device 10 is an example of an image reader that reads an image on a target object conveyed by the sheet conveyor.

The image forming apparatus 500 includes, for example, an image forming device 5001, a scanner 5002, and a display control unit 503. Specifically, the scanner 5002 is mounted on the image forming device 5001 to read an original document. The display control unit 503 is mounted on the scanner 5002 to be projected from the rear side of the scanner 5002.

The scanner 5002 causes a first moving unit and a second moving unit to perform reciprocating motion to scan the original document placed on an exposure glass of the scanner 5002.

The first moving unit includes, for example, a document illumination light source and a mirror. On the other hand, the second moving unit includes a plurality of reflection mirrors. A scanning light transmitted (reflected) from the second moving unit is collected by an image forming lens, to an image forming surface of a reading sensor disposed behind the image forming lens. Then, the collected light is read by the reading sensor as an image signal.

The display control unit 503 includes a speaker, and a liquid crystal panel having a pressure sensitive touch panel. The display control unit 503 is controlled by a main controller. Based on this control, the display control unit 503 displays an operation screen or a setting screen.

For example, in a case in which each screen is displayed, the display control unit 503 transmits selected or input information to the main controller. Further, the main controller causes the display control unit 503 to display the operation status of each unit of the image forming apparatus 500, messages to users regarding sheet supply, toner supply, and warning, visually on the liquid crystal panel and audibly by sound from the speaker.

The image forming device 5001 includes an image forming unit. Then, the image forming unit includes four process units disposed to function as a tandem-type image forming unit. Note that the four process units 1Y, 1C, 1M, and 1K in FIG. 12 may be collectively referred to as the process unit 1.

The process unit 1 is detachably attached to the housing of the image forming device 5001. The process units 1Y, 1C, 1M, and 1K have substantially the same configuration except for containing different color toners of yellow (Y), cyan C), magenta (M), and black (K) corresponding to color separation components of a color image.

The process unit 1 (i.e., the process units 1Y, 1M, 1C, and 1K) includes a photoconductor 2 (i.e., photoconductors 2Y, 2M, 2C, and 2K), a charging roller 3 (i.e., charging rollers 3Y, 3M, 3C, and 3K), a developing device 4 (i.e., developing devices 4Y, 4M, 4C, and 4K), and a cleaning blade 5 (i.e., cleaning blades 5Y, 5M, 5C, and 5K). The photoconductor 2 is a latent image bearer. The charging roller 3 is a charger that uniformly charges the surface of the photoconductor 2. The developing device 4 develops a toner image on the surface of the photoconductor 2. The cleaning blade 5 is a cleaner that cleans the surface of the photoconductor 2. As illustrated in FIG. 1, the process unit 1Y includes the photoconductor 2Y the charging roller 3Y, the developing device 4Y, and the cleaning blade 5Y, the process unit 1M includes the photoconductor 2M, the charging roller 3M, the developing device 4M, and the cleaning blade 5M; the process unit 1C includes the photoconductor 2C, the charging roller 3C, the developing device 4C, and the cleaning blade 5C; and the process unit 1K includes the photoconductor 2K, the charging roller 3K, the developing device 4K, and the cleaning blade 5K.

For example, an exposure device 6 is disposed above the process units 1Y, 1M, 1C, and 1K. The exposure device 6 exposes the surface of the photoconductor 2. The exposure device 6 includes, e.g., a light, source, a polygon mirror, an f-θ lens, and reflection mirrors. The exposure device 6 emits a laser light beam onto the surface of each of the photoconductors 2Y, 2C 2M, and 2K based on image data inputted via an external device such as a personal computer or the scanner 5002.

Further, a transfer device 7 is disposed, for example, below the process units 1Y, 1M, 1C, and 1K. The transfer device 7 includes, for example, an intermediate transfer belt 504. The intermediate transfer belt 504 is a transfer body including, for example, an endless belt. The intermediate transfer belt 504 is stretched around a plurality of tension rollers including tension rollers 21, 22, 23, and 24. Of the plurality of tension rollers, as one tension roller rotates as a drive roller, the intermediate transfer belt 504 circulates (rotates) in a direction indicated by arrow in FIG. 12.

Primary transfer rollers 505Y, 505C, 505M, and 505K are disposed at positions facing the photoconductors 2Y, 2C, 2M, and 2K, respectively. Each of the primary transfer rollers 505Y, 505C, 505M, and 505K functions as a primary transfer body. The primary transfer rollers 505Y, 505C, 505M, and 505K are disposed for each color. That is, the primary transfer roller 505Y is for transferring a yellow image, the primary transfer roller 505C is for transferring a cyan imago, the primary transfer roller 505M is for transferring a magenta image, and the primary transfer roller 505K is for transferring a black image. The primary transfer rollers 505Y, 505C, 505M, and 505K press the inner circumferential surface of the intermediate transfer belt 504 at the respective positions. As a result, respective primary transfer nip regions are formed at respective portions where the inner circumferential surface of the intermediate transfer belt 504 pressed by the primary transfer rollers 505Y, 505C, 505M, and 505K contact the photoconductors 2Y, 2C, 2M, and 2K.

The primary transfer rollers 505Y, 505C, 505M, and 505K are connected to a power supply. The power supply applies a predetermined direct current (DC) voltage, a predetermined alternating current (AC) voltage or both to the primary transfer rollers 505Y, 505C, 505M, and 505K.

For example, a secondary transfer roller 506 is disposed at a position facing or opposite the tension roller 24 via the intermediate transfer belt 504. The secondary transfer roller 506 presses the outer circumferential surface of the intermediate transfer belt 504. As a result, a secondary transfer nip region is formed at a portion where the secondary transfer roller 506 contacts the intermediate transfer belt 504. Similar to the primary transfer rollers 505Y, 505C, 505M, and 505K, the secondary transfer roller 506 is connected to a power supply. The power supply applies a predetermined direct current (DC) voltage, a predetermined alternating current (AC) voltage or both to the secondary transfer roller 506.

The medium containers 507 are disposed, for example, at the lower part of the housing of the image forming device 5001. Each medium container 507 contains recording media including the recording medium RM such as paper or overhead projector (OHP) transparency sheet. A sheet feed roller 508 feeds the recording medium RM from a selected one of the medium containers 507.

In the configuration of the image forming apparatus 500 in FIG. 12, a sheet ejection tray 509 is disposed at the left part of the housing of the image forming device 5001.

A sheet conveyance passage PR is an example of a passage to convey the recording medium RM from the medium container 507 to the sheet ejection tray 509 via the secondary transfer nip region. In the sheet conveyance passage PR, a pair of registration rollers 510 is disposed upstream from the position of the secondary transfer roller 506 in the sheet conveyance direction. On the other hand, a fixing device 8, the image reading device 10, and a pair of sheet ejection rollers 16 are disposed downstream from the position of the secondary transfer roller 506 in the sheet conveyance direction.

The fixing device 8 includes, for example, a fixing roller 17 and a pressure roller 18. The fixing roller 17 is an example of a fixing member including a beater inside. The pressure roller 18 is an example of a pressing member that presses the fixing roller 17. A fixing nip region is formed at a portion where the fixing roller 17 and the pressure roller 18 contact each other.

Further, the image forming apparatus 500 includes an arithmetic device such as a central processing unit (CPU). The image forming apparatus 500 further includes a main storage device and an auxiliary storage device such as a random access memory (RAM) and a read only memory (ROM).

For example, as a user instructs the start of the image forming apparatus 500 via the display control unit 503, the image forming apparatus 500 starts image formation. Specifically, the scanner 5002 reads an image on an original document to generate image data. The image forming apparatus 500 causes the image forming device 5001 to form an image based on the image data.

Based on the image information of the original document read by the scanner 5002, the exposure device 6 emits laser beams onto the uniformly charged surfaces of the photoconductors 2Y, 2C, 2M, and 2K. By so doing, respective electrostatic latent images are formed on the surfaces of the photoconductors 2Y, 2C, 2M, and 2K. At this time, the image information used to expose the respective photoconductors 2Y, 2C, 2M, and 2K is monochrome image data produced by decomposing a desired full color image into yellow, cyan, magenta, and black image data. The developing devices 4Y, 4C, 4M, and 4K supply yellow, cyan, magenta, and black toners to the electrostatic latent images formed on the photoconductors 2Y, 2C, 2M, and 2K, visualizing the electrostatic latent images as yellow, can magenta, and black toner images, respectively.

Toner images of respective colors on the photoconductors 2Y, 2C, 2M, and 2K are transferred one on another onto the intermediate transfer belt 504 by the transfer electric fields formed at the primary nip regions. Thus, the intermediate transfer belt 504 bears a full-color toner image on the surface. Further, residual toner remaining on each of the photoconductors 2Y, 2C, 2M, and 2K without being transferred onto the intermediate transfer belt 504 is removed by each of the cleaning blades 5Y, 5C 5M, and 5K.

The image forming apparatus including the image reading device 10 has the following functional configuration, for example.

Figure 13:
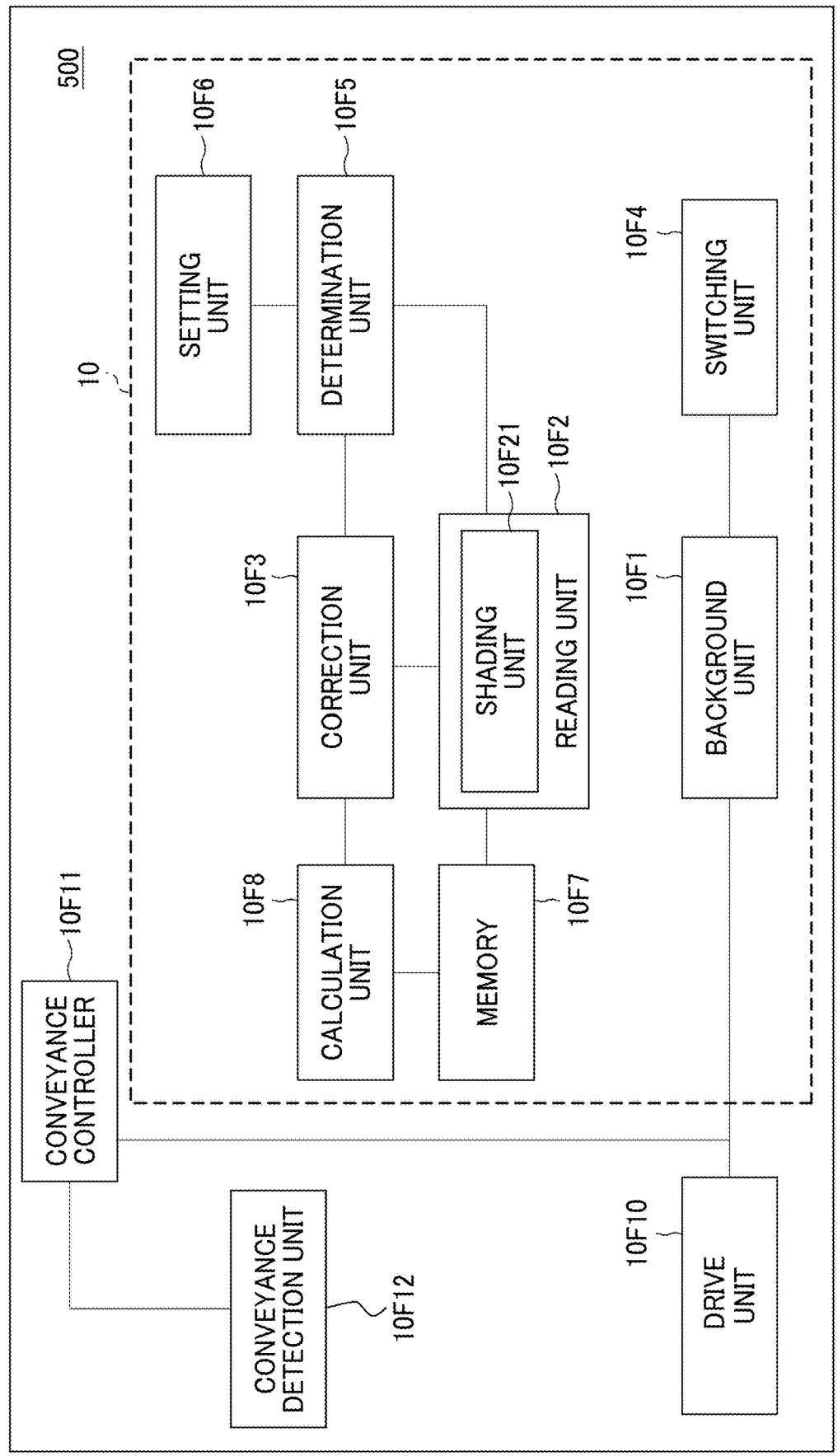
FIG. 13 is a diagram illustrating a functional configuration of the image forming apparatus of FIG. 12.

FIG. 13 is a block diagram illustrating an example of a functional configuration of the image forming apparatus.

For example, the image forming apparatus 500 includes, for example, the image reading device 10.

The image reading device 10 has a functional configuration including a background unit 10F1, a reading unit 10F2, and a correction unit 10F3. The image reading device 10 preferably have the functional configuration further including a switching unit 10F4, a determination unit 10F5, a setting unit 10F6, a memory 10F7, and a calculation unit 10F8. A description is given of the functional configuration of the image forming apparatus 500 with reference to FIG. 13.

The background unit 10F1 functions as a background used in reading the recording medium. For example, the background unit 10F1 is implemented by the roller 11.

The reading unit 10F2 performs a reading procedure for generating a read value by reading with the background unit 10F1 as a background. For example, the reading unit 10F2 is implemented with the line sensor 12.

The reading unit 10F2 includes, for example, a shading unit 10F21. The shading unit 10F21 performs, for example, shading on an image read by the reading unit 10F2.

The correction unit 10F3 performs a correction procedure to perform the correction (end correction) an a read value. For example, the correction unit 10F3 is implemented by the controller 13.

The switching unit 10F4 performs a switching, procedure to switch the color of the first region and the color of the second region in the background unit 10F1, according to the type of a recording medium. For example, the switching unit 10F4 is implemented by the drive device such as a motor.

The determination unit 10F5 performs a determination procedure to determine whether or not the read value is a value within the allowable range. For example, the determination unit 10F5 is implemented by the controller 13.

The setting unit 10F6 performs a setting procedure to set the allowable range of the reference value. For example, the setting unit 10F6 is implemented by the controller 13.

The memory 10F7 performs a storing procedure to store the reference value. For example, the memory 10F7 is implemented by the controller 13.

The calculation unit 10F8 performs a calculation procedure to calculate the correction parameter to perform correction (end correction) on the read value based on the reference value. For example, the calculation unit 10F8 is implemented by the controller 13.

A drive unit 10F10 causes the background unit 10F1 (roller 11) to convey the recording medium. For example, the drive unit 10F10 is implemented by, for example, a motor.

A conveyance controller 10F11 controls the drive unit 10F10. For example, the conveyance controller 10F11 is implemented by, for example, the arithmetic device and the sensors.

The conveyance detection unit 10F12 detects, for example, conveyance of the recording medium. For example, the conveyance detection unit 10F12 is implemented by the conveyance sensor 20.

Note that, in a case in which an image forming apparatus includes an image reading device as illustrated in FIG. 12, the function of the image reading device may be implemented by a hardware included in the image forming apparatus. For example, the correction unit 10F3 may be implemented by the arithmetic device included in the image forming apparatus. As described above, the hardware and functional configurations are not limited to the configuration illustrated in FIG. 12. Accordingly, the switching unit 10F4 and the conveyance controller 10F11, for example, may share the integrated function.

The type of the recording medium is determined to be a different type when, for example, the color, the thickness, the material, the size, or the shape is different. Then, the type of the recording medium is input by a user or detected by, for example, a sensor, so that the image reading device grasps what type of recording, medium is currently targeted. As described above, with the configuration in which the type of the recording medium is grasped, the image reading device, for example, switches the color of the first region and the color of the second region according to the type of the recording medium (that is, in a case in which the change of the recording medium to a different type is detected).

Variations of Roller

For example, the background unit 10F1 may be implemented by a roller as follows.

Figure 14:
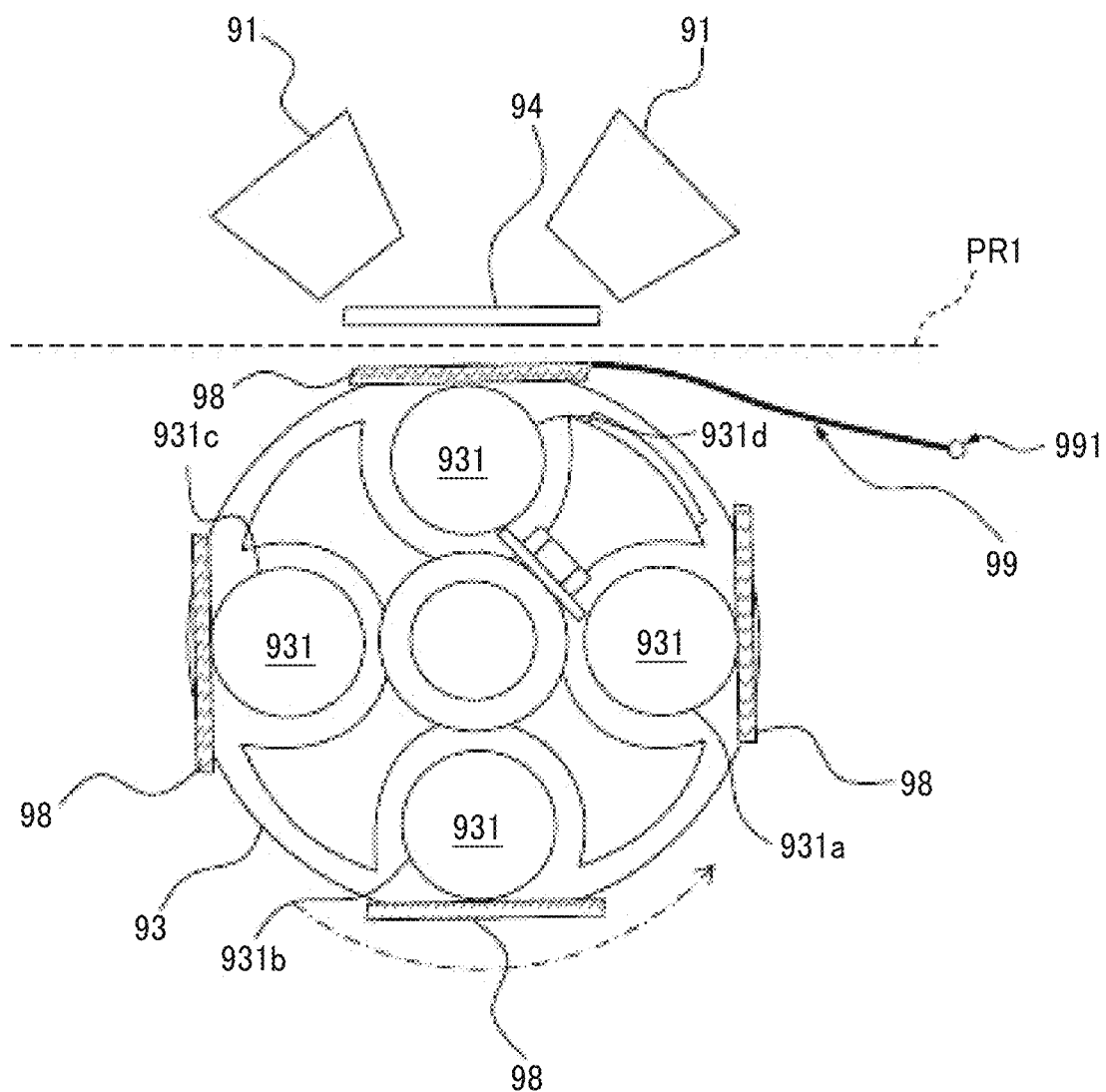
FIG. 14 is a diagram illustrating a first variation of a main part of the image reading device.

FIG. 14 is a diagram illustrating a first variation of a main part of an image reading device of the present embodiment.

FIG. 14 is an enlarged view of a portion around an opposing member 93 included in the image reading device.

For example, the image reading device is disposed downstream, from the fixing device 8 in the sheet conveyance direction. The image reading device optically reads an image formed on a recording medium. Then, the image reading device generates image data indicating an image to be inspected, based on the optically read image. Based on the image data generated by the image reading device, the image forming apparatus 500 performs the correction on the image to be formed on the recording medium. Therefore, it is preferable to vary the color of the opposing member 93 or the gap formed between the opposing members 93 and an exposure glass 94, according to the correction.

Figure 15:
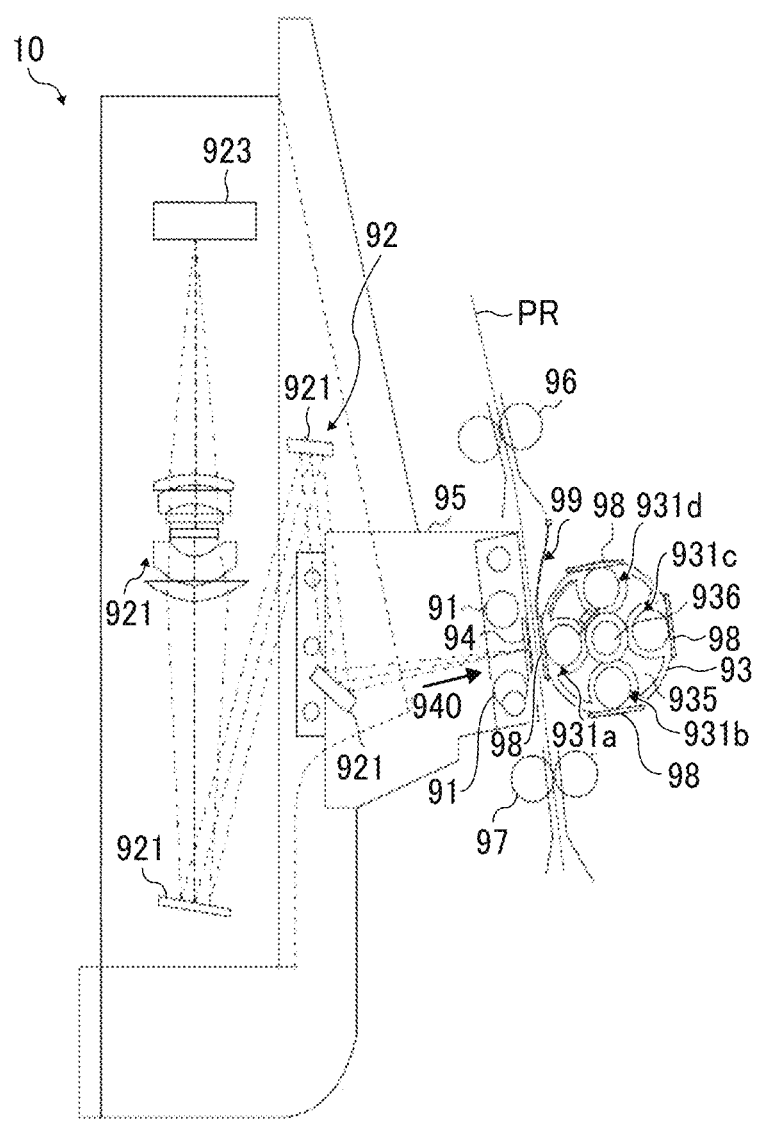
FIG. 15 is a diagram illustrating the image reading device including the first variation of the main part.

FIG. 15 is a diagram illustrating the image reading device 10 to which the first variation is applied.

The image reading device 10 includes an illumination light source 91, an image reading unit 92, the opposing member 93, the exposure glass 94, a support 95, a first conveyance guide 98, and a second conveyance guide 99. Note that the configuration of the image reading device 10 is not limited to the illustrated configuration. For example, the image reading device 10 may have a configuration without the first conveyance guide 98, for example.

The illumination light source 91 is disposed at a position to face a surface, of a recording medium on which an image is formed (i.e., an image forming surface) when the recording medium is conveyed to the illumination light source 91.

The illumination light source 91 illuminates a predetermined reading position for reading the image from the recording medium. The predetermined reading position is located in a sheet conveyance passage that is a part of the sheet conveyance passage PR. The part of the sheet conveyance passage PR is, for example, a partial sheet conveyance passage PR1 in FIG. 14 and a part through which the recording medium RM passes in the image reading device 10. The reading position corresponds to a part of the partial sheet conveyance passage PR1.

The image reading unit 92 includes three reflection mirrors 921, an image forming lens 922, and an image sensor unit 923.

The three reflection mirrors 921 guide a reflection light reflected on the image forming surface of the recording medium RM passing the reading position, from the reading position to the image forming lens 922.

The image forming lens 922 forms the reflection light reflected on the image forming surface of the recording medium RM guided by the three reflection mirrors 921, at the position of the image sensor unit 923.

The image sensor unit 923 includes at least one image sensor to read the image formed on the image forming surface of the recording medium RM.

In addition, the image sensor unit 923 reads the roller outer circumferential surfaces of rollers 931 (see FIG. 14) that functions as a curved opposing, portion of the opposing member 93 even when there is no recording medium on the partial sheet conveyance passage PR1. The roller outer circumferential surfaces of the rollers 931 includes, for example, a first roller outer circumferential surface 931a, a second roller outer circumferential surface 931b, a third roller outer circumferential surface 931c, and a fourth roller outer circumferential surface 931d.

Then, the image sensor unit 923 receives light of the image formed by the image forming lens 922 and generates image data according to the amount of received light.

The opposing member 93 is disposed at a position on the opposed side (the back side) of the image forming surface of the recording medium RM. That is, when the recording medium RM is conveyed, the opposing member 93 faces the opposed side of the image forming side of the recording medium RM. Further, the opposing member 93 further includes a roller bracket 935 that functions as a rotation holding member. The four rollers 931, each functioning as an opposing rotary body, are rotatably held by the roller bracket 935.

The four rollers 931 are rotatable rotary bodies including respective roller outer circumferential surfaces, which are the first roller outer circumferential surface 931a, the second roller outer circumferential surface 931b, the third roller outer circumferential surface 931c, and the fourth roller outer circumferential surface 931d functioning as a plurality of curved opposing portions, each having a reference plane warped in a convex shape. The rotary body rotates separately from the roller bracket 935.

The roller bracket 935 is fastened to a roller bracket shaft 936. The roller bracket shaft 936 rotates while holding the four rollers 931. According to this configuration, the four rollers 931 are selectively switchable among the roller outer circumferential surfaces of the rollers 931. By so doing, the partial sheet conveyance passage PR1 forms the predetermined reading position facing the exposure glass 94 with a space (gap) through which the recording medium RM passes.

Note that, of the roller outer circumferential suffices of the plurality of the rollers 931, the reading position is set, for example, at the closest position to the exposure glass 94 with respect to the roller outer circumferential surface of the roller 931 that is disposed facing the exposure glass 94 (the first roller outer circumferential surface 931a in FIG. 15). Further, the reading position may be set to a position close to the exposure glass 94 by the thickness of the recording medium RM from the closest facing position of the roller outer circumferential surfaces of the rollers 931 selectively facing the exposure glass 94, to the exposure glass 94.

The exposure glass 94 that functions as a first transparent member is a light transmitting member disposed at a position at which the exposure glass 94 faces the image forming suffice of the recording medium when the recording medium is conveyed to the predetermined reading position.

That is, the exposure glass 94 is disposed between the image reading device 10 and the opposing member 93. Then, the exposure glass 94 is disposed at a position facing one face of the recording medium RM.

The illumination light source 91 and the image reading unit 92 are fixed to the support 95. The partial sheet conveyance passage PR1 of the sheet conveyance passage PR is supported by the support 95 separately from the upstream and downstream sides of the sheet conveyance passage PR in the sheet conveyance direction.

For example, a first conveyance roller 96 is disposed upstream from the partial sheet conveyance passage PR1 in the sheet conveyance direction and a second conveyance roller 97 is disposed downstream from the partial sheet conveyance passage PR1 in the sheet conveyance direction.

The first conveyance guide 98 functioning as a second transparent member is a light transmitting member disposed close to the reading position at each of the roller outer circumferential surfaces of the plurality of rollers 931 included in the opposing member 93.

The first conveyance guide 98 includes a part of the partial sheet conveyance passage PR1 and has a smooth surface that is smooth to such an extent to avoid being a conveyance load when the recording medium passes over the opposing member 93 functioning as a background member.

Since the first conveyance guide 98 is included in the optical system included in the image reading device 10, the first conveyance guide 98 is formed of a material (for example, glass or Akris) having a small influence on the optical characteristics.

That is, the first conveyance guide 98 is disposed between the image reading device 10 and the opposing member 93. Then, the first conveyance guide 98 is disposed at a position to face the opposite face of the image forming surface of the recording medium RM.

The first conveyance guide 98 prevents friction (or collision) between the target object and each of the opposing member 93 and the roller outer circumferential faces of the rollers 931 and prevents contamination of the opposing member 93 (or the rollers 931) that may occur due to passage of the recording medium.

Further, the first conveyance guide 98 is also a sheet conveyance passage former to narrow the partial sheet conveyance passage PR1 to such an extent that the recording medium can pass through. As a result, the partial sheet conveyance passage PR1 is a smooth sheet conveyance passage with a narrow gap and the self-cleaning effect of the reading position may be enhanced by passage of the recording medium.

The second conveyance guide 99 that functions as a conveyance guide is a slope-shaped member disposed upstream from the partial sheet conveyance passage PR1 in the sheet conveyance direction. The second conveyance guide 99 includes a rotation axis 991 that is rotatable with one end as a free end (i.e., the end portion close to the partial sheet conveyance passage PR1).

The free end of the second conveyance guide 99 contacts the upstream end portion of the first conveyance guide 98 or the opposing member 93 when the opposing member 93 rotates to change the roller outer circumferential surface of the roller 931 facing the reading position.

At this time, by rotating about the rotation axis 991 as a fulcrum, the free end of the second conveyance guide 99 escapes so as not to hinder the rotation of the opposing member 93.

When the recording medium has passed the sheet conveyance passage PR to be conveyed to the reading position, the second conveyance guide 99 prevents the leading end of the recording medium from contacting (or colliding) with the opposing member 93 (i.e., any of the roller outer circumferential surfaces of the rollers 931).

In a case in which the second conveyance guide 99 is not included in the image reading device 10, the leading end of the recording medium RM in the sheet conveyance direction, which is collided in the partial sheet conveyance passage PR1 that narrows from the sheet conveyance passage PR upstream from the opposing member 93 in the sheet conveyance direction, contacts (or collides) with the opposing member 93 (that is, the outer circumferential surface of the roller 931).

At this time, the conveyance of the recording medium is temporarily hindered by, for example, frictional resistance with the opposing member 93. Further, the recording medium is pressed from the upstream side in the sheet conveyance direction.

The leading end of the recording medium slides on the circumferential surface of the opposing member 93. Then, the recording medium moves on from the collision position to the downstream side in the sheet conveyance direction. The impact at this time causes the recording medium to shift to deviate at the reading position. Therefore, as the image forming surface of the shifting recording medium is read, the image forming surface of the recording medium is read in an out-of-focus state. Therefore, the accuracy in reading is likely to deteriorate.

By contrast, by disposing the second conveyance guide 99 upstream from the opposing member 93, the smoothness of the recording medium RM in conveyance is enhanced. As a result, the accuracy in reading is enhanced.

The reading process of the image formed on the image forming surface of the recording medium will be described in detail. When the recording medium is conveyed, in other words, when the recording medium passes the reading position, the image reading unit 92 passes the reading position between the exposure glass 94 and the first conveyance guide 98 that is brought to the position below the exposure glass 94 to face the exposure glass 94.

In this case, the image forming surface of the recording medium is read is read from the direction indicated by an arrow 940. The first roller outer circumferential surface 931a of the opposing member 93 is disposed at the position facing the exposure glass 94.

By using the first roller outer circumferential surface 931a as a reference plane, the reading accuracy of an image is obtained. At this time, the recording medium moves by sliding on the smooth surface of the first conveyance guide 98.

Therefore, the first conveyance guide 98 has a function of conveying the recording medium. Then, a narrow gap is formed to such an extent, that the recording medium does not flap, so as to be a part of the sheet conveying device that prevents, for example, a paper jam.

The four rollers 931 disposed on the opposing member 93 are rollers having at least one of different colors and diameters.

Therefore, of the rollers 931 including the respective roller outer circumferential surfaces, for example, the roller 931 having the first roller outer circumferential surface 931a is black, has a normal radius, and corresponds to the above-described black member 11B.

The roller 931 having the second roller outer circumferential surface 931b is white, has a small radius, and corresponds to the above-described white member 11W.

The roller 931 having the third roller outer circumferential surface 931c is white, has a normal radius, and corresponds to the above-described white member 11W.

The roller 931 having the fourth roller outer circumferential surface 931d is black, has a small radius, and corresponds to the above-described black member 11B.

The color of the rollers 931 are changed depending on the sheet conveyance mode of the recording medium. The notification mode is set and changed by the display operation device included in the apparatus body controller.

Note that the diameter of each roller 931 may be determined depending on the thickness of a recording medium or whether being used in the shading. Since each roller 931 rotates so that the outer circumferential surface is changed depending on the thickness of the recording medium, the site of the gap in the partial sheet conveyance passage PR1 is settable according to the thickness of the recording medium.

Note that rollers such as the rollers 931 may have a configuration described below.

Figure 16:
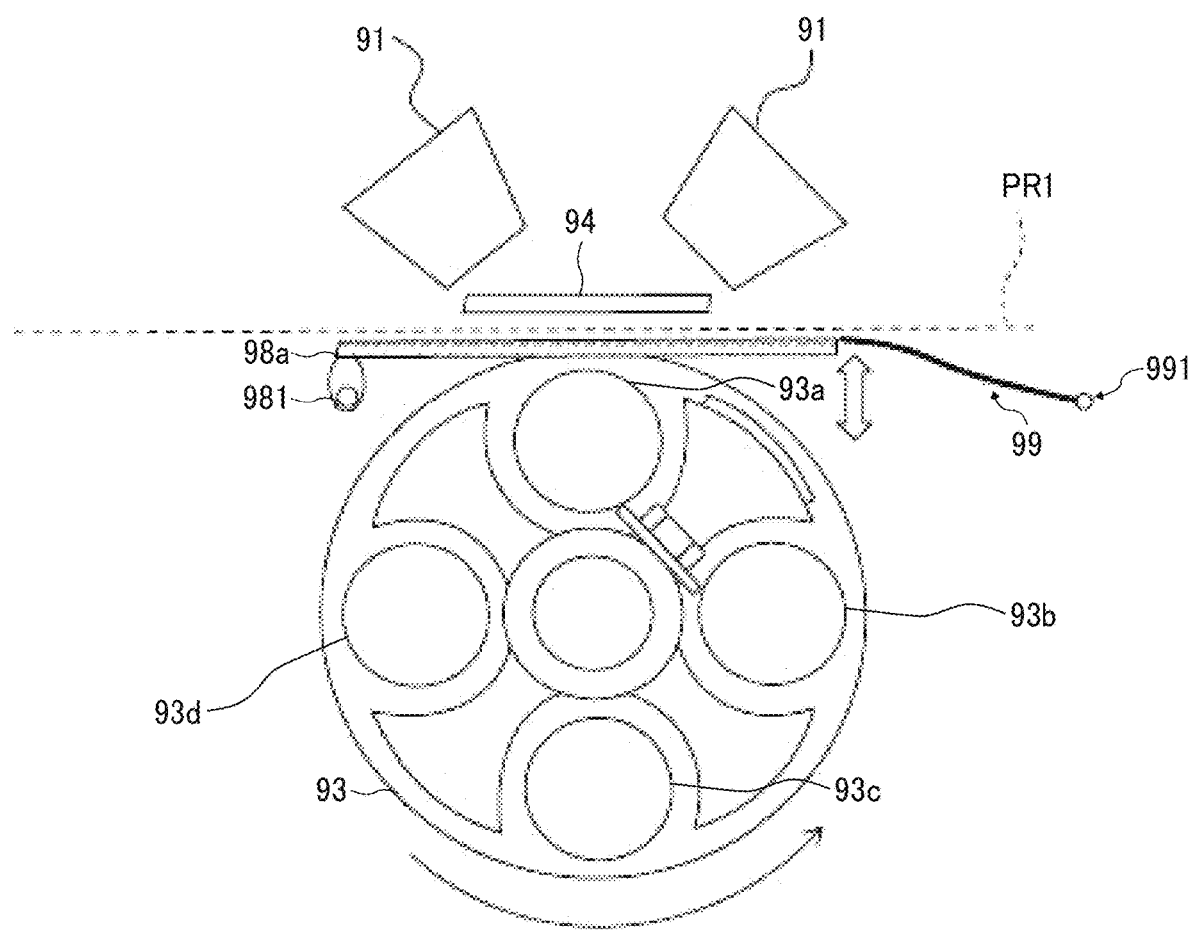
FIG. 16 is a diagram illustrating a second variation of the main part of the image reading device.

FIG. 16 is a diagram illustrating a second variation of the image reading device of the present embodiment.

For example, a first conveyance guide 98a may move with respect to the opposing member 93. In this case, the first conveyance guide 98a is disposed at a position facing the exposure glass 94 across the partial sheet conveyance passage PR1.

The opposing member 93 includes rollers 93a, 93b, 93c, and 93d. The first conveyance guide 98a changes the gap formed with the partial sheet conveyance passage PR1 according to the positions of the outer circumferential surfaces of the rollers 93a, 93b, 93c, and 93d of the opposing member 93. Note that each of the rollers 93a and 93b corresponds to the above-described white member 11W and each of the rollers 93c and 93d corresponds to the above-described black member 11B.

In other words, the first conveyance guide 98a is a member that changes the distance (gap) with respect to the exposure glass that functions as a first transparent member.

The first conveyance guide 98a is also a transparent member that penetrates light from the illumination light source 91 and the reflection light from a recording medium.

The first conveyance guide 98a includes a cam 981 that functions as a drive source.

The rotation of the cam 981 is controlled by the apparatus body controller in the notification mode of the recording medium RM. Rotation of the cam 981 changes the position of the first conveyance guide 98a.

Figure 17:
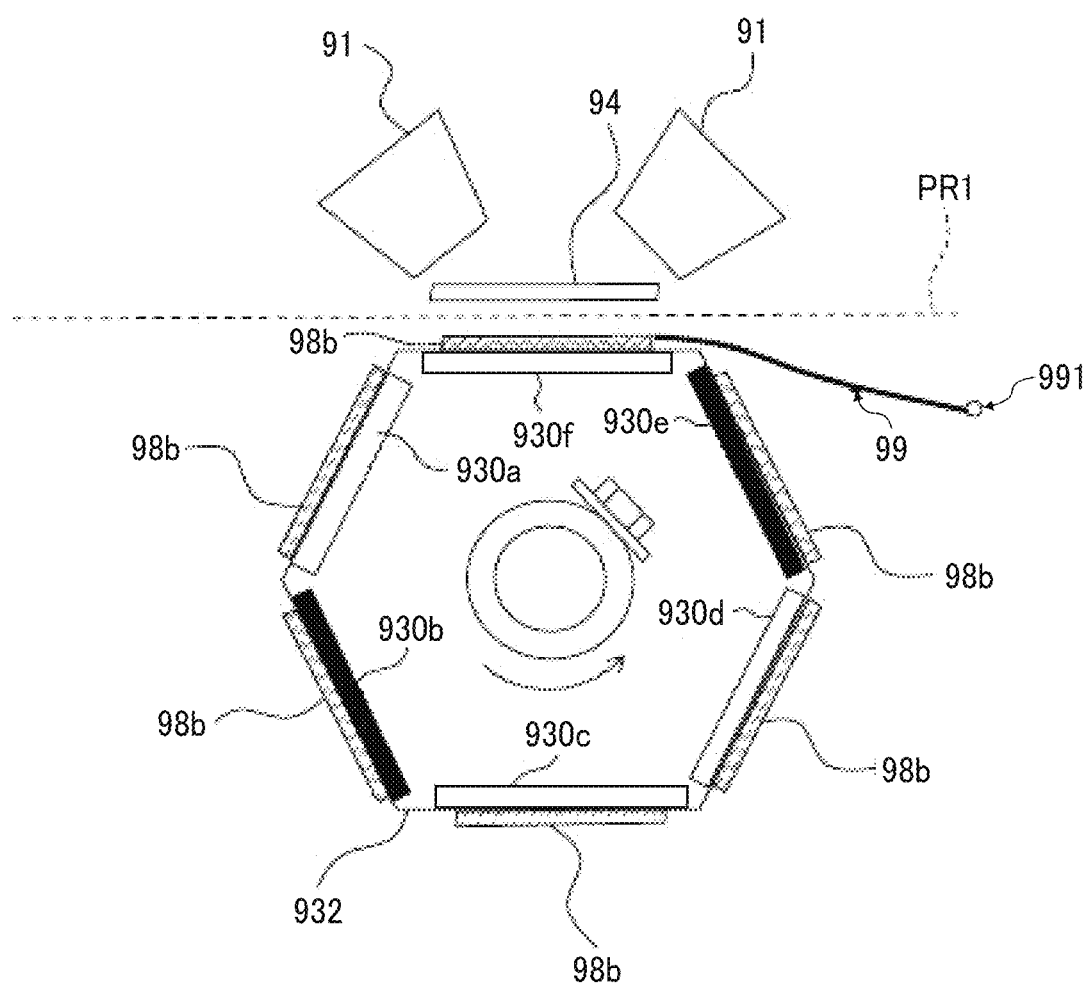
FIG. 17 is a diagram illustrating a third variation of the main part of the image reading device.

FIG. 17 is a diagram illustrating a third variation of the image reading device of the present embodiment.

The opposing member is not limited to a member having a circular cross section. For example, the opposing member may be a polygonal member having a polygonal cross section. In the third variation, the opposing member has a hexagonal cross section.

In this case, an opposing member 932 rotates along the sheet conveyance direction of a recording medium. Then, as the opposing member 932 rotates, the position of the opposing member 932 changes.

The opposing member 932 has multiple background faces (i.e., background faces 930a, 930b, 930c, 930d, 930e, and 930f in FIG. 17) of the above-described rollers, with respect to the multiple outer circumferential surfaces (i.e., six outer circumferential surfaces in the third variation). The background faces 930a, 930b, 930c, 930d, 930e, and 930f function as opposing portions having different thicknesses or different colors. Note that each of the background faces 930a, 930c, 930d, and 930f corresponds to the above-described white member 11W and each of the background faces 930b and 930e corresponds to the above-described black member 11B.

Further, a first conveyance guide 98b is disposed with respect to each of the background faces 930a, 930b, 930c, 930d, 930e, and 930f to protect each of the background faces 930a, 930b, 930c, 930d, 930e, and 930f. As the opposing member 932 rotates, the first conveyance guide 98b of each of the background faces 930a, 930b, 930c, 930d, 930e, and 930f is brought to face the partial sheet conveyance passage PR1.

The image reading device 10 may have a configuration employing the above-described roller of Variation 3.

In the above-described embodiments and variations, the image reading device 10 reads the white member 11W to perform the shading to correct uneven image density in the main scanning direction in the level of reading.

Figure 21:
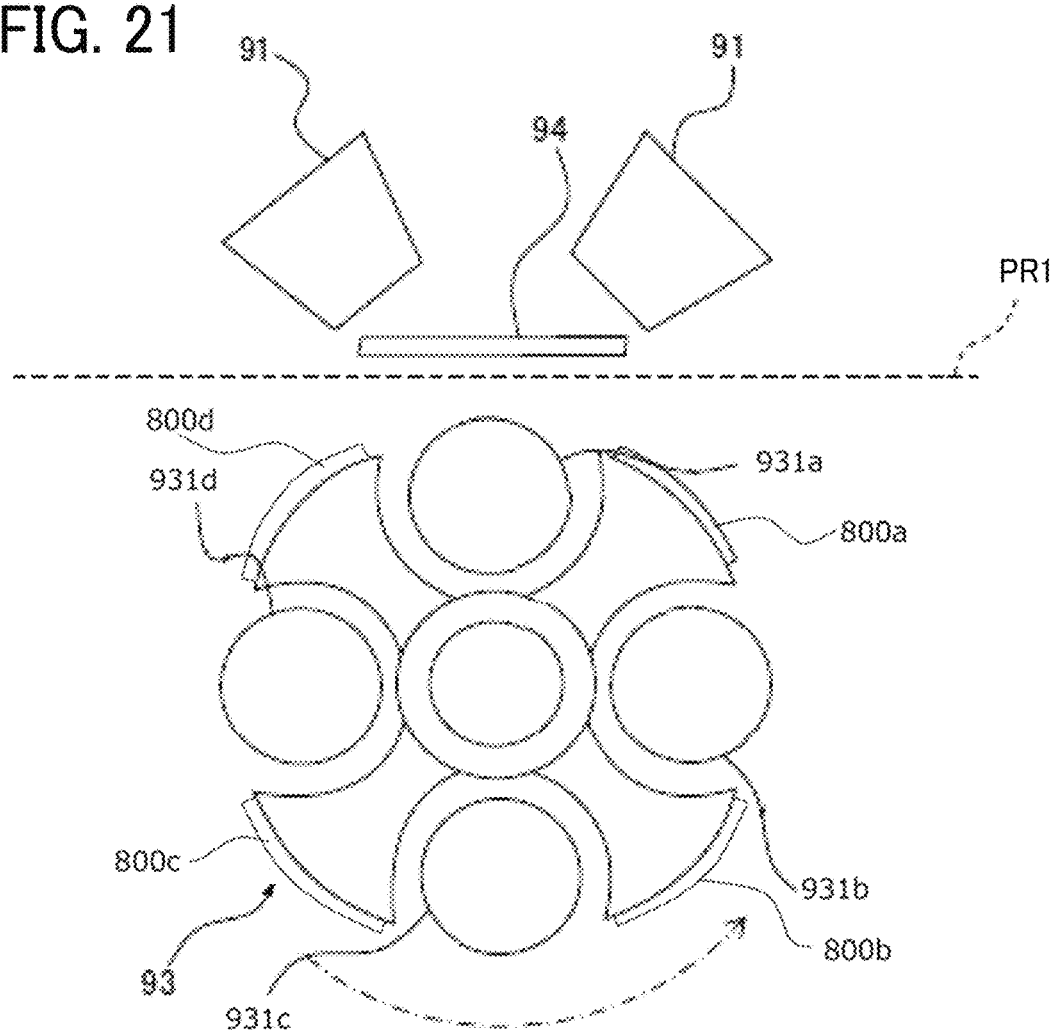
FIG. 21 is a diagram illustrating a configuration of the image forming apparatus of FIG. 14, with a white panel being added.

FIG. 21 is a diagram illustrating a configuration of the image reading device of FIG. 14, further including a white panel.

Note that the present embodiment may be applied to other embodiments illustrated in, for example, FIG. 1.

The first roller outer circumferential surface 931a and the fourth roller outer circumferential surface 931d correspond to the above-described black member 11B. The second roller outer circumferential surface 931b and the third roller outer circumferential surface 931c correspond to the above-described white member 11W.

Each of white plates 800a, 800b, 800c and 800d has a width in the main scanning direction (X direction). The width of each of the white plates 800a, 800b, 800c, and 800d is same as the width of each of the white member 11W and the black member 11B.

Each of the white plates 800a, 800b, 800c, and 800d is disposed between adjacent rollers of the rollers 931a, 931b, 931c, and 931d. Since the white plate 800 (indicating any one of the white plates 800a, 800b, 800c, and 800d) is disposed between the adjacent rollers, the time required for switching the position from the roller 931 (indicating any one of the rollers 931*a*, 931*b*, 931*c*, and 931*d*) to the white plate is reduced, and the productivity of the image reading device is enhanced.

Other Embodiment

Now, a description is given of other embodiments of the present disclosure. The recording medium is, for example, a paper material or a plain paper. In addition to plain paper, examples of the recording medium include, but are not limited to, coated paper, label paper, an overhead projector sheet, a film, and a flexible thin plate. In other words, the recording medium (or a recording medium that is used for an inkjet image forming apparatus) is made of a material to which ink droplets are at least temporarily adherable, a material to which ink droplets adheres and fixes, or a material to which ink droplets adheres and permeate. Specific examples of a recording material or formation made of such a material include, but are not limited to, a recording medium such as a sheet, a film, or cloth, an electronic component such as an electronic substrate or a piezoelectric element (which may be referred to as a piezoelectric component), layered powder, an organ model, and a testing cell. In short, the recording medium is made of any material to which liquid is adherable, such as paper, thread, fiber, fabric, leather, metal, plastic, glass, wood, ceramic, or a combination thereof.

Such embodiments and variations thereof are included in the scope and gist of the embodiments of the present disclosure and are included in the embodiments described in claims and the equivalent scope thereof.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image reading device comprising:
   a background structure to be a background in reading of a recording medium;
   the background structure including:
      a first region that is black; and
      a second region that is disposed in line with the first region in a main scanning direction;
   a line sensor to:
      read an image with the background structure as the background; and
      generate a read value based on a result of reading the image with the background structure;
   circuitry configured to correct the read value based on a reference value generated by the line sensor by reading the second region of the background structure;
   a memory to store the reference value; and
   a calculator to calculate a correction parameter to correct the read value based on the reference value,
   wherein the circuitry is configured to correct the read value based on the correction parameter.

2. The image reading device according to claim 1, further comprising a switcher to switch a color of the first region according to a type of the recording medium.

3. The image reading device according to claim 2,
   wherein the circuitry is configured to:
      perform a predetermined number of corrections based on the reference value generated by the line sensor after reading the second region of the background structure; and
      in response to the predetermined number of corrections by the line sensor, correct based on another reference value generated by the line sensor by reading the first region of the background structure having a white surface switched by the switcher.

4. The image reading device according to claim 1,
   wherein the recording medium and the second region of the background structure are white.

5. The image reading device according to claim 1, further comprising:
   a setter to set an allowable range of the reference value; and
   a determinator to determine whether the read value is within the allowable range,
   wherein the circuitry is configured to determine a value to be the reference value or whether to correct the read value, according to a determination result of the determinator.

6. The image reading device according to claim 1,
   wherein, in response to reception of heat after generation of the reference value or passage of time after generation of the reference value, the circuitry is configured to correct the read value based on the correction parameter.

7. The image reading device according to claim 6,
   wherein the calculator estimates a correlation of a reading position of the line sensor and a variation of the read value with respect to the reading position, and
   wherein the circuitry is configured to correct the read value with respect to each reading position, based on the correction parameter.

8. The image reading device according to claim 1,
   wherein the first region includes a region in which the recording medium passes, and wherein the second region includes a region at a position out of the first region.

9. The image reading device according to claim 1, wherein the circuitry is configured to correct based on the reference value generated by the line sensor by reading the second region.

10. The image reading device according to claim 1, wherein the background structure includes a roller.

11. An image forming apparatus comprising:

an image former to form an image on a recording medium;

a background structure to be a background in reading of a recording medium with the image formed by the image former;

the background structure including:
  a first region that is black; and
  a second region that is disposed in line with the first region in a main scanning direction;

a line sensor to:
  read the image with the background structure as the background; and
  generate a read value based on a result of reading the image with the background structure;

circuitry configured to correct the read value based on a reference value generated by the line sensor by reading the second region of the background structure;

a memory to store the reference value; and a calculator to calculate a correction parameter to correct the read value based on the reference value, wherein the circuitry is configured to correct the read value based on the correction parameter.

\* \* \* \* \*